US011829411B2

(12) United States Patent
Yuan

(10) Patent No.: US 11,829,411 B2
(45) Date of Patent: Nov. 28, 2023

(54) DATA RECOVERY METHOD AND APPARATUS, ELECTRONIC DEVICE, AND STORAGE MEDIUM

(71) Applicant: Tencent Technology (Shenzhen) Company Limited, Shenzhen (CN)

(72) Inventor: Liangsheng Yuan, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 17/959,196

(22) Filed: Oct. 3, 2022

(65) Prior Publication Data
US 2023/0026780 A1 Jan. 26, 2023

Related U.S. Application Data

(63) Continuation of application No. PCT/CN2021/112005, filed on Aug. 11, 2021.

(30) Foreign Application Priority Data

Sep. 15, 2020 (CN) .......................... 202010967446.7

(51) Int. Cl.
*G06F 16/00* (2019.01)
*G06F 16/65* (2019.01)
*G06F 16/75* (2019.01)

(52) U.S. Cl.
CPC .............. *G06F 16/65* (2019.01); *G06F 16/75* (2019.01)

(58) Field of Classification Search
CPC ........ G06F 16/65; G06F 16/75; G06F 16/438; G06F 16/2471; G06F 16/2246; G06F 16/2255
See application file for complete search history.

(56) References Cited

U.S. PATENT DOCUMENTS

| 10,628,450 B1* | 4/2020 | Keskar .................. G06F 16/134 |
| 2007/0061832 A1* | 3/2007 | Kim ..................... H04N 21/435 |
| | | 348/E7.072 |
| 2015/0278023 A1* | 10/2015 | Lee ..................... G06F 16/2282 |
| | | 707/685 |

FOREIGN PATENT DOCUMENTS

| CN | 109492049 A | 3/2019 |
| CN | 110362571 A | 10/2019 |

(Continued)

OTHER PUBLICATIONS

Tencent Technology, WO, PCT/CN2021/112005, dated Oct. 27, 2021, 5 pgs.

(Continued)

*Primary Examiner* — Jared M Bibbee
(74) *Attorney, Agent, or Firm* — Morgan, Lewis & Bockius LLP

(57) ABSTRACT

A data recovery method includes receiving a request to recover target audio and video behavior data generated during use of an audio and video application by a target user. The target audio and video behavior data has been deleted from a database. The method includes obtaining a target data category of the target audio and the video behavior data; searching a blockchain system for the target audio and video behavior data based on the target data category, the blockchain system being configured to store operation data generated by the audio and video application that includes first operation data of audio and video behavior data. The method includes storing the target audio and video behavior data in the database; and returning the target audio and video behavior data to the target user.

20 Claims, 10 Drawing Sheets

(56) References Cited

FOREIGN PATENT DOCUMENTS

| | | |
|---|---|---|
| CN | 110688261 A | 1/2020 |
| CN | 110933468 A | 3/2020 |
| CN | 111125776 A | 5/2020 |
| CN | 111342966 A | 6/2020 |
| CN | 111651296 A | 9/2020 |
| CN | 111651300 A | 9/2020 |
| CN | 111930753 A | 11/2020 |

OTHER PUBLICATIONS

Tencent Technology, IPRP, PCT/CN2021/112005, dated Mar. 21, 2023, 6 pgs.
Tencent Technology, Isr, PCT/CN2021/112005, dated Oct. 27, 2021, 2 pgs.

* cited by examiner

DATA RECOVERY METHOD AND APPARATUS, ELECTRONIC DEVICE, AND STORAGE MEDIUM

CROSS-REFERENCE TO RELATED APPLICATIONS

This application is a continuation application of PCT Patent Application No. PCT/CN2021/112005, entitled "METHOD AND DEVICE FOR DATA RETRIEVAL, ELECTRONIC DEVICE, AND STORAGE MEDIUM" filed on Aug. 11, 2021, which claims priority to Chinese Patent Application No. 202010967446.7, filed with the State Intellectual Property Office of the People's Republic of China on Sep. 15, 2020, and entitled "DATA RECOVERY METHOD AND APPARATUS, ELECTRONIC DEVICE, AND STORAGE MEDIUM", all of which are incorporated herein by reference in their entirety.

FIELD OF THE TECHNOLOGY

The present invention relates to the technical field of computer applications, and in particular, to a data recovery technology.

BACKGROUND OF THE DISCLOSURE

With the rapid development of communication technologies, people have increasingly high requirements for functions of terminals such as a mobile phone and a computer, and increasingly more terminal-based applications emerge. Especially an audio and video application has gradually become an indispensable tool for daily work and people's life. A triggering operation behavior of the user on the audio and video provided by the audio and video application generates audio and video behavior data of the user.

In the related art, the audio and video behavior data of the user is usually stored in a database by an audio and video server. When the user requests to query historical audio and video behavior data through the audio and video application, the audio and video server directly queries the database for the data and returns the data to the audio and video application, so that the user performs a subsequent operation on the queried historical audio and video behavior data.

When the user requests to delete the historical audio and video behavior data through the audio and video application, the audio and video server directly completely deletes the historical audio and video behavior data from the database. In this case, the user cannot request to recover the deleted historical audio and video behavior data through the audio and video application, which degrades user experience of using the audio and video application to a certain extent.

SUMMARY

In view of this, this application provides a data recovery method and apparatus, an electronic device, and a storage medium, so as to realize recovery of historical audio and video behavior data that has been deleted. The technical solutions are described as follows:

According to a first aspect, an embodiment of this application provides a data recovery method, including:
receiving a request to recover target audio and video behavior data generated during use of an audio and video application by a target user, wherein the target audio and video behavior data has been deleted from a database;
obtaining a target data category of the target audio and the video behavior data;
searching a blockchain system for the target audio and video behavior data based on the target data category, the blockchain system being configured to store operation data generated by the audio and video application that includes first operation data of audio and video behavior data; storing the target audio and video behavior data in the database; and
returning the target audio and video behavior data to the target user.

According to a second aspect, an embodiment of this application provides a data recovery apparatus, including:
a data category acquisition unit, configured to acquire a target data category to which target audio and video behavior data belongs, the target audio and video behavior data being data that a target user requests to recover and generated during use of an audio and video application by the target user, and the target audio and video behavior data being historical audio and video behavior data that has been deleted from a database;
a data recovery unit, configured to search a blockchain system for the target audio and video behavior data according to the target data category, the blockchain system being configured to store operation data generated by the audio and video application, the operation data including first operation data representing audio and video behavior data;
a data storage unit, configured to store the target audio and video behavior data in the database; and
a data return unit, configured to return the target audio and video behavior data to the target user.

According to a third aspect, an embodiment of this application provides an electronic device, including: a processor and a memory, the processor and the memory being connected to each other by using a communication bus; the processor being configured to invoke and execute a program stored in the memory; and the memory being configured to store a program, and the program being configured to implement the data recovery method.

According to a fourth aspect, an embodiment of this application provides a computer-readable storage medium storing a computer program, the computer program, being executed and loaded by a processor, implementing steps of the data recovery method.

According to a fifth aspect, an embodiment of this application provides a computer program product, the computer program product, when run on a computer, causing the computer to implement steps of the data recovery method.

The embodiments of this application provide a data recovery method and apparatus, an electronic device, and a storage medium. A target data category to which target audio and video behavior data that a target user requests to recover belongs is acquired (the target audio and video behavior data is historical audio and video behavior data that has been deleted from the database). A blockchain system configured to store operation data (the operation data includes first operation data representing audio and video behavior data of the audio and video application) of the audio and video application may be searched for the target audio and video behavior data according to the target data category. In this way, the queried target audio and video behavior data can be stored in the database and can be returned to the audio and video application for viewing by the target user, thereby realizing the recovery of the audio and video behavior data ever deleted from the database.

DESCRIPTION OF EMBODIMENTS

Figure 1:
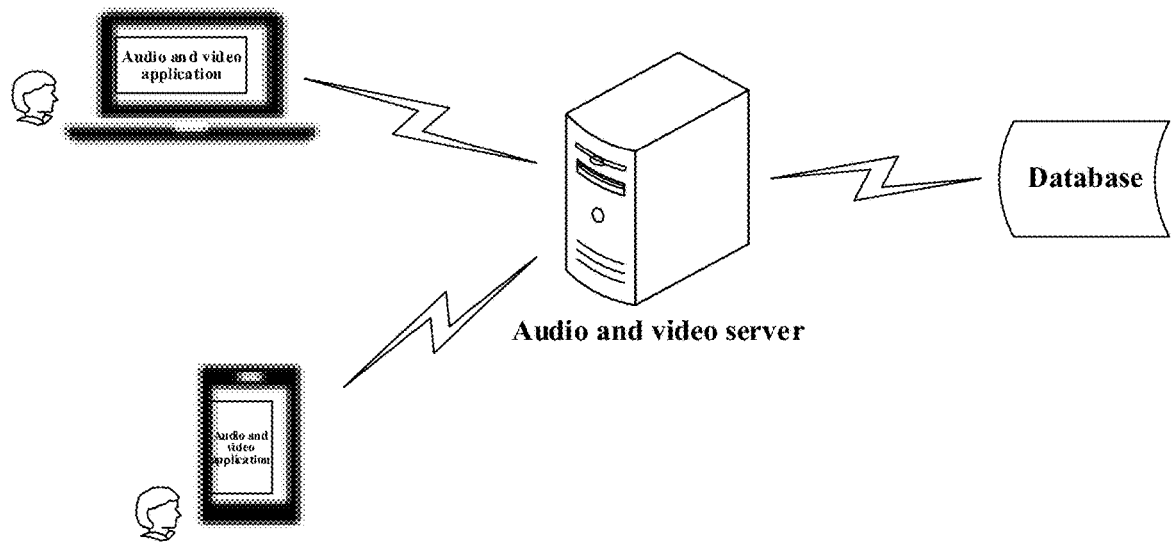
FIG. 1 is a schematic structural diagram of an audio and video system in the related art according to an embodiment of this application.

FIG. 1 is a schematic structural diagram of an audio and video system according to an embodiment of this application. As shown in FIG. 1, the audio and video system includes a terminal, an audio and video server, and a database. A user may install a client of an audio and video application on the terminal, and the audio and video server is configured to provide a background service for the audio and video application.

A database may be considered as an electronic file cabinet, that is, a place for storing an electronic file. A user may perform an operation such as add, query, update, or delete data in the file. The so-called "database" is a data set that is stored together in a specific manner, can be shared with a plurality of users, has as little redundancy as possible, and is independent of applications.

In the foregoing audio and video system, a triggering operation behavior of the user on the audio and video provided by the audio and video application installed on the terminal generates corresponding audio and video behavior data. The audio and video behavior data is stored in the database by the audio and video server.

The user may transmit a data query request through the audio and video application. The audio and video server queries the database for a request result corresponding to the data query request after receiving the data query transmitted by the audio and video application, and returns the request result to the audio and video application.

Further, the user may further transmit a data deletion request through the audio and video application. The audio and video server completely deletes, from the database after receiving the data deletion request transmitted by the audio and video application, to-be-deleted data indicated by the data deletion request. In this case, when the user retransmits, through the audio and video application, the data query request for querying the data that has been completely deleted from the database, the audio and video server receives the data query request, and is unable to find the request result corresponding to the data query request from the database. That is to say, in the above audio and video system, the user cannot recover the audio and video behavior data that has been completely deleted from the database.

An embodiment of this application provides a new audio and video system, and the audio and video system may also be referred to as a data recovery system. The data recovery system not only can recover the audio and video behavior data once deleted from the database, but also can store the recovered audio and video behavior data in the database again. In this way, when the data query request for the audio and video behavior data transmitted by the user is subsequently received, the audio and video behavior data that has been deleted from the database may still be found from the database.

The data recovery system provided in this embodiment of this application introduces a blockchain system for realizing a data recovery function. The blockchain system is described in detail below.

A blockchain is a new application mode of computer technologies such as distributed data storage, point-to-point transmission, a consensus mechanism, and an encryption algorithm. The blockchain is essentially a decentralized database and a series of associated data blocks generated in a cryptographic manner. Each data block includes information about a batch of network transactions for verifying the validity of the information (for anti-counterfeiting) and generating a next block. The blockchain may include an underlying blockchain platform, a platform product service layer, and application service layer.

The blockchain underlying platform may include processing modules such as a user management module, a basic service module, an intelligent contract module, and an operation supervision module. The user management module is responsible for identity information management of all blockchain participants, including maintenance of public key and private key generation (account management), key management, and maintenance of a relationship between a user's real identity and a blockchain address (authority management), or the like, and in the case of authorization, supervising and auditing some real-identity transactions, and providing rule configuration of risk control (risk control audit). A basic service module is deployed on all blockchain node devices to verify validity of a service request, and records a valid request to a storage after completing consensus. For a new service request, a basic service first performs interface adaptation parsing and authentication processing (interface adaptation), then encrypts service information through a consensus algorithm (consensus management), completely and consistently transmits the new service request to a shared ledger (network communication) after encryption, and records and stores the new service request. A smart contract module is responsible for registration and issuance of a contract, as well as contract triggering and contract execution. A developer may define contract logic through a programming language, publish the contract logic to the blockchain (contract registration), according to logic of a contract term, call a key or other events to trigger execution, complete the contract logic, and further provide functions of contract upgrade and cancellation. The operation monitoring module is mainly responsible for deployment, configuration modification, contract configuration, cloud adaptation, and visual output of real-time status during product operation in a product release process, such as: alarms, monitoring network conditions, monitoring health status of a node device, or the like.

The platform product service layer provides basic capabilities and implementation frameworks for typical applications. Based on the basic capabilities, the developers may superimpose service features to complete a blockchain implementation of the service logic. The application service layer provides a blockchain solution-based application service for use by a service participant.

Using the distributed system as the blockchain system as an example, the blockchain system includes a plurality of nodes. When any node in the blockchain system receives input information, other nodes in the blockchain system obtain the input information according to a consensus algorithm, and store the input information, so that data stored in all the nodes in the blockchain system is consistent.

Each node in the blockchain system has a corresponding node identifier, and the each node in the blockchain system may store the node identifiers of other nodes in the blockchain system, to subsequently broadcast the generated block to other nodes in the blockchain system according to the node identifiers of other nodes. Each node may maintain a node identifier list shown in the following table, and store node names and node identifiers correspondingly in the node identifier list. A node identifier may be an Internet Protocol (IP) address and any other type of information capable of identifying the node. IP addresses in Table 1 are only used as an example for description.

TABLE 1

| Node name | Node identifier |
|---|---|
| Node 1 | 117.114.151.174 |
| Node 2 | 117.116.189.145 |
| ... | ... |
| Node N | 119.123.789.258 |

Figure 2:
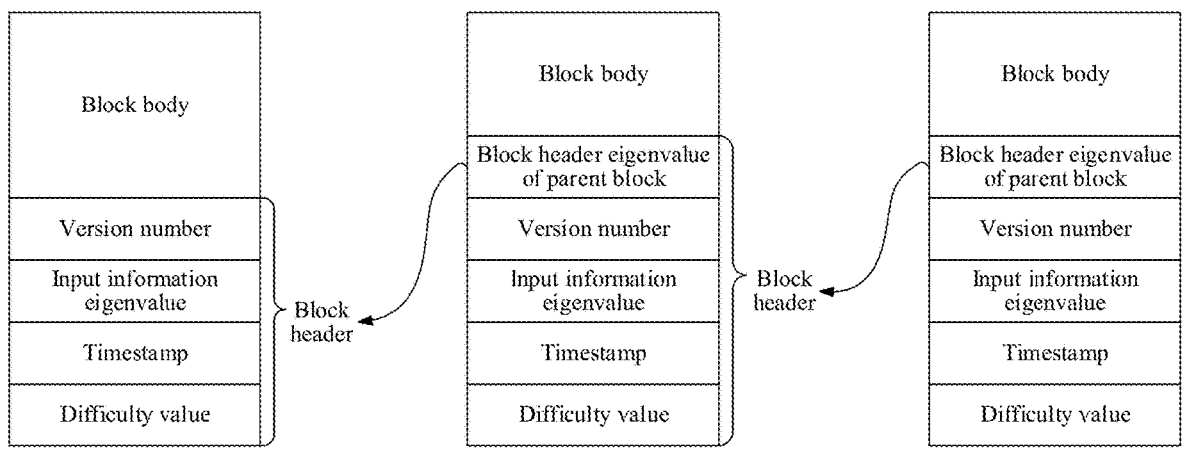
FIG. 2 is a schematic structural diagram of a blockchain according to an embodiment of this application.

Each node in the blockchain system stores the same blockchain. Referring to FIG. 2, the blockchain includes a plurality of blocks, and a genesis block includes a block header and a block body. The block header stores a feature value of input information, a version number, a timestamp, and a difficulty value, and the block body stores the input information. Referring to FIG. 2, the blockchain includes a plurality of blocks, and a genesis block includes a block header and a block body. The block header stores a feature value of input information, a version number, a timestamp, and a difficulty value, and the block body stores the input information.

Figure 3:
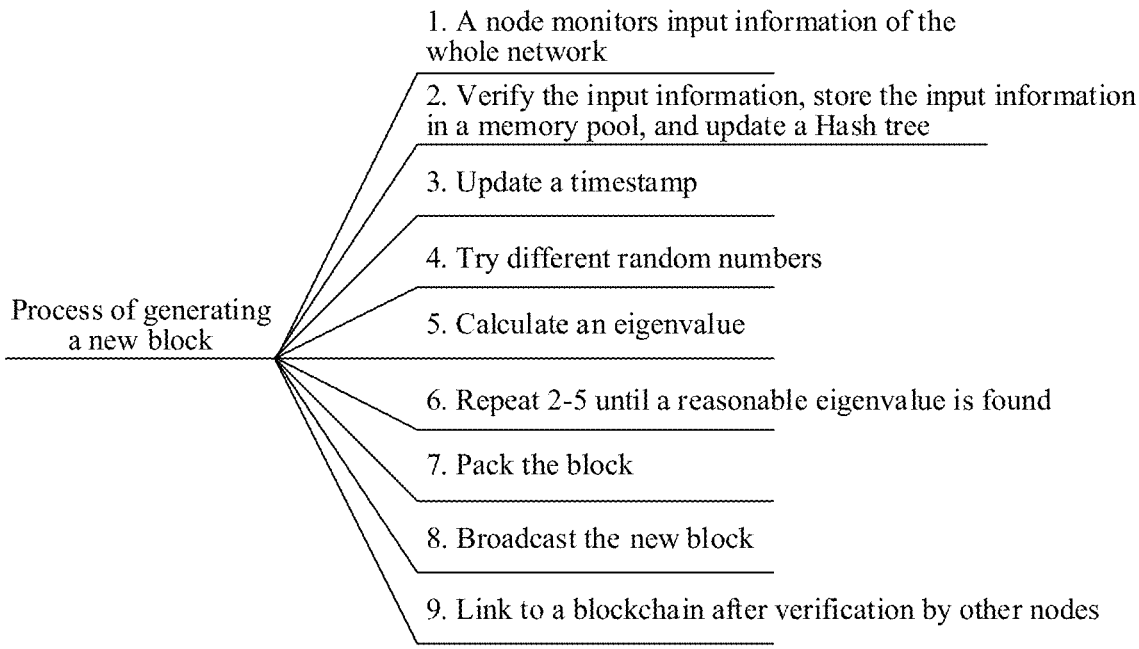
FIG. 3 is a schematic diagram of a generation process of a new block according to an embodiment of this application.

When blocks are generated in the blockchain, referring to FIG. 3, in response to a node in which the blockchain is located receiving the inputted information, the inputted information is verified. After the verification is completed, the inputted information is stored in a memory pool, and a hash tree thereof used for recording the inputted information is updated. Next, the timestamp is updated to the time when the inputted information is received, different random numbers are tried, and feature value calculation is performed a plurality of times, so that the calculated feature value may satisfy the following formula:

$$SHA256(SHA256(version+prev\_hash+merkle\_root+ntime+nbits+x))<TARGET$$

SHA256 is an eigenvalue algorithm used for calculating an eigenvalue; version (a version number) represents version information of a relevant block protocol in the blockchain; prev_hash represents an eigenvalue of a block header of a parent block of a current block; merkle_root represents an eigenvalue of input information; ntime represents an update time at which a timestamp is updated; nbits represents a current difficulty, which is a fixed value within a period of time and is determined again after exceeding a fixed period of time; x is a random number; and TARGET represents an eigenvalue threshold, and the eigenvalue threshold may be determined according to nbits.

In this way, when a random number satisfying the above formula is obtained through calculation, information may be correspondingly stored, and a block header and a block body are generated, to obtain a current block. Subsequently, the node where the blockchain is located transmits, according to node identifiers of other nodes in the blockchain system, a newly generated block separately to the other nodes in the blockchain system where the node is located. The other nodes perform verification on the newly generated block, and after completing the verification, add the newly generated block the blockchain that the other nodes store.

Based on the foregoing detailed description of the blockchain system introduced by the data recovery system provided in this embodiment of this application, the data recovery system provided in this embodiment of this application is further described below. The data recovery system provided in this embodiment of this application includes at least a terminal, an audio and video server, a database, and a blockchain system. Functions of the terminal, the audio and video server, the database, and the blockchain system are described below.

The terminal is configured to install a client of an audio and video application, and the client may be an application client or a web version client.

The terminal may be any electronic product that can interact with a user, such as an electronic device that interacts with the user in one or more manners such as a keyboard, a touchpad, a touchscreen, a remote control, a voice interaction or handwriting device, and the like. For example, the terminal may be a mobile phone, a tablet computer, a notebook computer, a palmtop computer, a personal computer, a smart speaker, a wearable device, a smart TV, a smart watch, and the like, which is not limited thereto.

The audio and video server is configured to provide a background service for the audio and video application. The audio and video server may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform. The terminal and the audio and video server may be directly or indirectly connected through wired or wireless communication, which is not limited herein in this application.

The database is configured to store audio and video behavior data of the audio and video application. For example, the database may be an SQL database, a NoSQL database, and the like, which is not limited herein. In this embodiment of this application, a triggering operation behavior of the user through the audio and video application on the terminal generates the audio and video behavior data, and the data recovery system may store the audio and video behavior data in the database. Exemplarily, the audio and video behavior data may be stored in the database by the audio and video server in the data recovery system.

A blockchain located in a blockchain node of the blockchain system is configured to store operation data of the audio and video application. That is, the operation data of the audio and video application is stored, as input information, in a block body of the block in the block chain.

For example, the operation data includes first operation data and second operation data. The first operation data represents the audio and video behavior data generated by the audio and video application. The second operation data represents operation information on the audio and video behavior data stored in the database.

The blockchain system can realize the storage of the operation data of the audio and video application by using technical characteristics such as blockchain traceability (a chain structure of a block), distribution consistency (a consensus algorithm), and tamper resistance (cryptology). Technical implementation of the foregoing three points is described below in combination with the operation data of the audio and video application.

Traceability: By using the chain structure of the block, after the user deletes the audio and video behavior data stored in the database, if the user wants to recheck the deleted audio and video behavior data, the user may trace back to the audio and video behavior data of the user according to the chain structure.

Distribution consistency: In fact, if each node in a distributed system can guarantee trouble-free operation with very strong performance (an instant response and high throughput), the consensus process is not complicated, which can be simply realized by voting through a multicast process. It is a pity that such a "perfect" system does not exist in reality. In an existing distributed system, a delay always exists in response to a request, a network may be interrupted, a node may fail, and even a malicious node may deliberately destroy the system. For the operation data of the audio and video application, it is believed that there is no malicious response. Therefore, in order to ensure the consistency of the system, a Raft algorithm is used as a consensus mechanism. A network organization structure under the mechanism is a master-slave structure, and can allow less than ½ of failure nodes.

Tamper resistance: The tamper resistance mainly uses technologies such as encryption, a Merkle tree, and a distributed storage.

For the encryption, a hash value of account information of a user in the audio and video application is used as an encrypted key. Therefore, if the account information of the user cannot be known, content of the operation data of the audio and video application of the user before the encryption cannot be obtained.

The user may obtain the account information by registering at the audio and video application (the account information includes an account and a password). When the user successfully logs in to the audio and video application using the account information, the user may be considered as a logged-in user, and the account information used by the user to log in to the audio and video application may be considered as the account information of the user in the audio and video application. When the user successfully logs in to the audio and video application without using the account information, the user may be considered as an unlogged-in user (a visitor). In this case, the account information used by the user to log in to the audio and video application may be regarded as device information of the terminal where the audio and video application used by the user is located. The device information includes hardware device information of the terminal and a password assigned to the hardware device information by the audio and video application.

For example, the hardware device information of the terminal may be regarded as a hardware device identifier of the terminal, and the hardware device identifier of the terminal may be regarded as the account.

In this embodiment of this application, a hash calculation may be first performed on the password of the account information to obtain a first hash value, and then a hash calculation is performed on the first hash value and the account corresponding to the account information to obtain a second hash value. The second hash value is used for encrypting the operation data of the user, and storing the encrypted operation data in the blockchain system.

Figure 4:
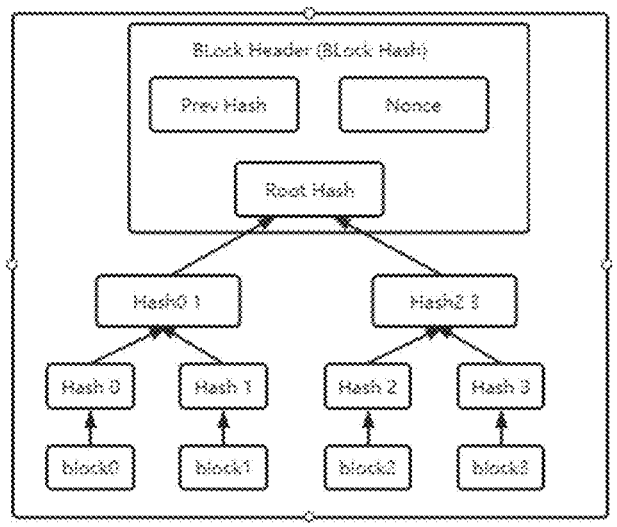
FIG. 4 is a schematic structural diagram of a Merkle tree according to an embodiment of this application.

For a Merkle tree, the use of the Merkle tree can ensure that the data block received by other nodes is not damaged and not replaced. A structure of the Merkle tree (a hash tree) is shown in FIG. 4. The Merkle tree is a binary tree structure consisting of a root node, a set of intermediate nodes, and a set of leaf nodes. As shown in FIG. 4, the leaf nodes in the Merkle tree include stored data or a hash value of the stored data, and non-leaf nodes (including the intermediate node and the root node) are hash values of content of two child nodes of the non-leaf nodes. Any change to underlying data in the Merkle tree is to be transferred to a parent node of the Merkle tree, which means that a root value of the Merkle tree actually represents a "numerical digest" of all of the underlying data. The blockchain system is based on the encryption, the Merkle tree, and the distributed storage, which can effectively prevent, from being tampered with, the operation data of the audio and video application stored in the blockchain system.

Based on the foregoing description of the functions of the terminal, the audio and video server, the database, and the blockchain system that constitute the data recovery system provided in the embodiments of this application, the structures of two data recovery systems provided in the embodiments of this application are described in detail with reference to FIG. and FIG. 6.

Figure 5:
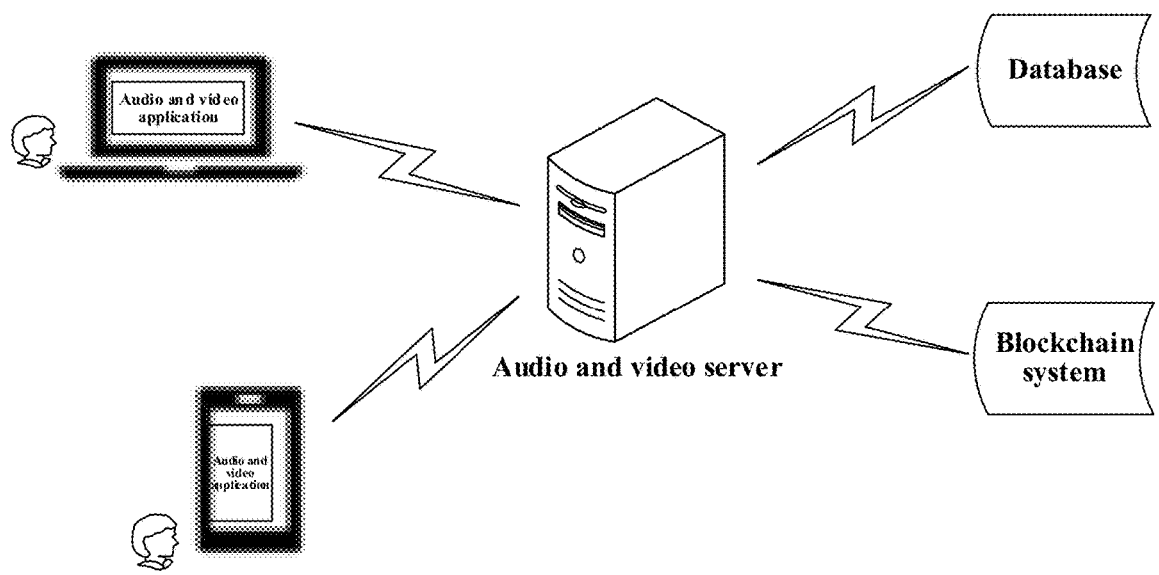
FIG. 5 is a schematic structural diagram of a data recovery system according to an embodiment of this application.

FIG. 5 is a schematic structural diagram of a data recovery system according to an embodiment of this application.

The data recovery system shown in FIG. 5 includes a terminal, an audio and video server, a database, and a blockchain system. For the functions of the terminal, the audio and video server, the database, and the blockchain system, reference is made to the foregoing description, and the details are not described herein.

For example, the data recovery method provided in this embodiment of this application may be applicable to the terminal in the data recovery system shown in FIG. 5, or may be applicable to the audio and video server in the data recovery system shown in FIG. 5.

Figure 6:
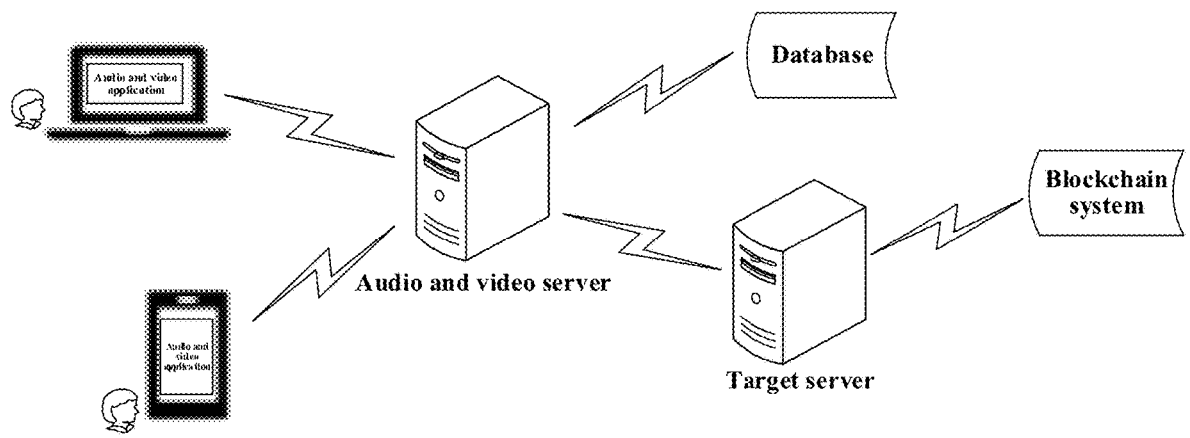
FIG. 6 is a schematic structural diagram of another data recovery system according to an embodiment of this application.

FIG. 6 is a schematic structural diagram of another data recovery system according to an embodiment of this application.

The data recovery system shown in FIG. 6 includes a terminal, an audio and video server, a target server, a database, and a blockchain system. For the functions of the terminal, the audio and video server, the database, and the blockchain system, reference is made to the foregoing description, and the details are not described herein.

The target server may be an independent physical server, may also be a server cluster or distributed system composed of a plurality of physical servers, and may also be a cloud server providing basic cloud computing services, such as a cloud service, a cloud database, cloud computing, a cloud function, cloud storage, a network service, cloud communication, a middleware service, a domain name service, a security service, a CDN, and a large data and AI platform.

For example, the data recovery method provided in this embodiment of this application may be applicable to a target server in the data recovery system shown in FIG. 6.

FIG. 5 and FIG. 6 are only example diagrams, and there may be various types of terminals, which are not limited to the smart phone and the notebook computer in FIG. 5 and FIG. 6. In addition, only two terminals are shown in FIG. 5 to FIG. 6. In practical application, a quantity of terminals may be determined according to an actual situation, and is not limited to the quantity shown in FIG. 5 to FIG. 6.

The data recovery method provided in this embodiment of this application is described in detail with reference to FIG. 5 to FIG. 6.

According to the data recovery method provided in this embodiment of this application, the audio and video behavior data generated by a triggering operation of the user on the audio and video in the audio and video application through the audio and video application may be stored in the blockchain system. That is, first operation data corresponding to the audio and video behavior data is stored in the blockchain system.

According to the data recovery method provided in this embodiment of this application, a tracing operation may further be performed on the audio and video behavior data stored in the blockchain system to obtain traceability data, and the traceability data is stored in the blockchain system. That is to say, the first operation data stored in the blockchain system further includes the traceability data.

Further, in the data recovery method provided in this embodiment of this application, the operation behavior of the user on the audio and video behavior data involves an operation on the audio and video behavior data stored in the database. Correspondingly, in the data recovery method provided in this embodiment of this application, the operation behavior of the user on the audio and video behavior data stored in the database generates second operation data. The second operation data represents operation information (that is, the operation behavior) of the user on the audio and video behavior data of the audio and video application in the database. According to the data recovery method provided in this embodiment of this application, the second operation data may further be stored in the blockchain system.

According to the data recovery method provided in this embodiment of this application, the operation data generated by the user through the audio and video application (the operation data includes the first operation data and the second operation data) is stored in the blockchain system. In this way, after the audio and video behavior data stored in the database is deleted, the audio and video behavior data that has been deleted from the database can be recovered from the blockchain system.

For ease of understanding, the data recovery method provided in this embodiment of this application applicable to the audio and video server in the data recovery system shown in FIG. 5 is used as an example. A manner in which the data recovery system shown in FIG. 5 implements the data recovery function is described in detail.

The triggering operation behavior of the user on the audio and video provided by the audio and video application on the terminal generates the audio and video behavior data corresponding to the operation behavior. The audio and video server may store the audio and video behavior data respectively in the database and the blockchain system.

In this embodiment of this application, the behavior such as watching, paying, gifting, and exchanging generated through the audio and video application may be regarded as the triggering operation behavior of the user on the audio and video provided by the audio and video application. The triggering operation behavior of the user on the audio and video provided by the audio and video application generates the audio and video behavior data, and data types of the audio and video behavior data generated for different operation types of operation behaviors are different.

For example, when the operation behavior is a behavior of watching the audio and video, audio and video behavior data generated for the behavior of watching the audio and video may be referred to as audio and video watching data, and the audio and video watching data belongs to a category of audio and video watching data. For example, when the operation behavior is a behavior associated with payments for the audio and video, audio and video behavior data generated for the behavior of such payment may be referred to as audio and video purchase data, and the audio and video purchase data belongs to a category of audio and video purchase data. For example, when the operation behavior is a behavior of paying for membership privileges of an audio and video application (that is, membership of an audio and video application is purchased), audio and video behavior data generated by the behavior of paying for the membership privileges of the audio and video application may be referred to as membership privilege purchase data, and the membership privilege purchase data belongs to a category of membership privilege purchase data. For example, when the operation behavior is a behavior of exchanging the audio and video, audio and video behavior data generated for the behavior of exchanging the audio and video may be referred to as audio and video exchange data, and the audio and video exchange data belongs to a category of audio and video exchange data. For example, when the operation behavior is a behavior of gifting the audio and video, audio and video behavior data generated for the behavior of gifting the audio and video may be referred to as audio and video gifting data, and the audio and video gifting data belongs to a category of audio and video gifting data.

The foregoing is the content of the audio and video behavior data provided in the embodiments of this application. The specific content about the audio and video behavior data may be set by the inventor according to the requirements of the inventor, which is not limited herein.

Each piece of audio and video behavior data carries a unique data identifier. That is to say, different audio and video behavior data carry different data identifiers.

The audio and video behavior data may further carry a generation time of the audio and video behavior data. For example, the user watched video 1 on the audio and video application from 10:00 on Mar. 3, 2020 to 11:00 on Mar. 3, 2020. Corresponding audio and video behavior data is generated for the behavior of watching the video 1 by the user, and a generation time carried by the audio and video behavior data is from 10:00 on Mar. 3, 2020 to 11:00 on Mar. 3, 2020.

The audio and video server not only can store, in the blockchain system, the audio and video behavior data generated through the audio and video application, but also can perform the tracing operation on the audio and video behavior data stored in the blockchain system, so as to obtain corresponding traceability data and store the traceability data in the blockchain system. The audio and video behavior data and the traceability data in the blockchain system may be considered as the first operation data of the blockchain system.

Since the audio and video behavior data is data generated by the triggering operation behavior on the audio and video provided by the audio and video application, the audio and video behavior data may also be regarded as the operation data.

The user may transmit a data query request to the audio and video server through the audio and video application on the terminal. The audio and video server queries the database for a request result corresponding to the data query request (that is, acquires, from the database, to-be-queried audio and video behavior data indicated by the data query request) after receiving the data query request, and returns the request result to the audio and video application. The request result is displayed on a display interface by the audio and video application.

The user views the request result displayed on the display interface by the audio and video application. When the user does not require some audio and video behavior data in the request result, the user may further transmit a data deletion request to the audio and video server through the audio and video application, and the audio and video server may delete, from the database after receiving the audio and video data deletion request, to-be-deleted audio and video behavior data indicated by the data deletion request.

When the user does not require some audio and video behavior data, the user may transmit the data deletion request to the audio and video server through the audio and video application. In this case, the audio and video server only deletes the to-be-deleted audio and video behavior data indicated by the data deletion request and stored in the database, and is not required to delete the audio and video behavior data in the blockchain system.

Further, the audio and video server may further generate second operation data related to the data deletion request. The second operation data represents the operation information on the audio and video behavior data stored in the database. Specifically, the second operation data related to the data deletion request represents a data deletion operation on the to-be-deleted audio and video behavior data indicated by the data deletion request and stored in the database, and the second operation data is stored in the blockchain system.

For example, the second operation data related to the data deletion request indicates the to-be-deleted audio and video behavior data indicated by the data deletion request. That is to say, the second operation data related to the data deletion request indicates the to-be-deleted audio and video behavior data indicated by the data deletion operation corresponding to the data deletion request. Specifically, the second operation data representing the data deletion operation may include a data identifier of each piece of to-be-deleted audio and video behavior data indicated by the data deletion operation. For example, the data deletion request indicates two pieces of to-be-deleted audio and video behavior data. The two pieces of audio and video behavior data are respectively audio and video behavior data 1 and audio and video behavior data 2. The data identifier of the audio and video behavior data 1 is a data identifier 1, and the data identifier of the audio and video behavior data 2 is a data identifier 2. Correspondingly, the second operation data related to the data deletion request includes the data identifier 1 and the data identifier 2.

Further, when the user wants to recover the audio and video behavior data that has been deleted from the database, the user may transmit a data recovery request to the audio and video server through the audio and video application. After receiving the data recovery request, the audio and video server queries the blockchain system for the request result of the data recovery request (that is, searches, according to the data recovery request, the blockchain system for the audio and video behavior data that has been deleted from the database), and stores the found audio and video behavior data in the database, so as to restore, to the database, the audio and video behavior data that has been deleted from the database. In this way, the user may directly find the restored audio and video behavior data from the database next time. In addition, the audio and video server not only can store the found audio and video behavior data in the database, but also can return the found audio and video behavior data to the audio and video application, so that the audio and video application can display, on the display interface, the audio and video behavior data received by the audio and video application, which is convenient for the user to view.

Further, the audio and video server may further generate second operation data related to the data recovery request. The second operation data represents the operation information on the audio and video behavior data stored in the database. Specifically, the second operation data related to the data recovery request represents an operation of recovering, to the database, to-be-recovered audio and video behavior data indicated by the data recovery request, and the second operation data is stored in the blockchain system. For example, the second operation data related to the data recovery request indicates the to-be-recovered audio and video behavior data indicated by the data recovery request. That is to say, the second operation data related to the data recovery request indicates the to-be-recovered audio and video behavior data indicated by a data recovery operation corresponding to the data recovery request. Specifically, the second operation data representing the data recovery operation may include a data identifier of each piece of to-be-recovered audio and video behavior data indicated by the data recovery operation.

For example, the data recovery request indicates two pieces of to-be-recovered audio and video behavior data. The two pieces of audio and video behavior data are respectively audio and video behavior data 3 and audio and video behavior data 4. The data identifier of the audio and video behavior data 3 is a data identifier 3, and the data identifier of the audio and video behavior data 4 is a data identifier 4. Correspondingly, the second operation data related to the data recovery request includes the data identifier 3 and the data identifier 4.

The triggering operation behavior of the user on the audio and video provided by the audio and video application generates the audio and video behavior data. Both the data deletion operation and the data recovery operation may be considered as operations on the audio and video behavior data in the database. The data deletion operation is performed on the audio and video behavior data in the database to obtain the second operation data representing the data deletion operation, and the data recovery operation is performed on the audio and video behavior data in the database to obtain the second operation data representing the data recovery operation.

The data recovery function provided in this embodiment of this application is applicable to the data recovery system. The database in the data recovery system is configured to store the audio and video behavior data stored in the database by the audio and video server. The blockchain system in the data recovery system is configured to store the audio and video behavior data stored in the database by the audio and video server, and further configured to store the traceability data and the second operation data stored in the database by the audio and video server (in this application, the audio and video behavior data, the traceability data, and the second operation data of the audio and video application may be all regarded as the operation data of the audio and video application). The operation data of the audio and video application is stored in the blockchain system, so that the audio and video behavior data in the database can be recovered from the blockchain system after being deleted, and user profile analysis may also be performed on the user to generate a user profile of the user according to the operation data of the user in the audio and video application stored in the blockchain system, thereby improving the accuracy of the result of user profile analysis.

Figure 7:
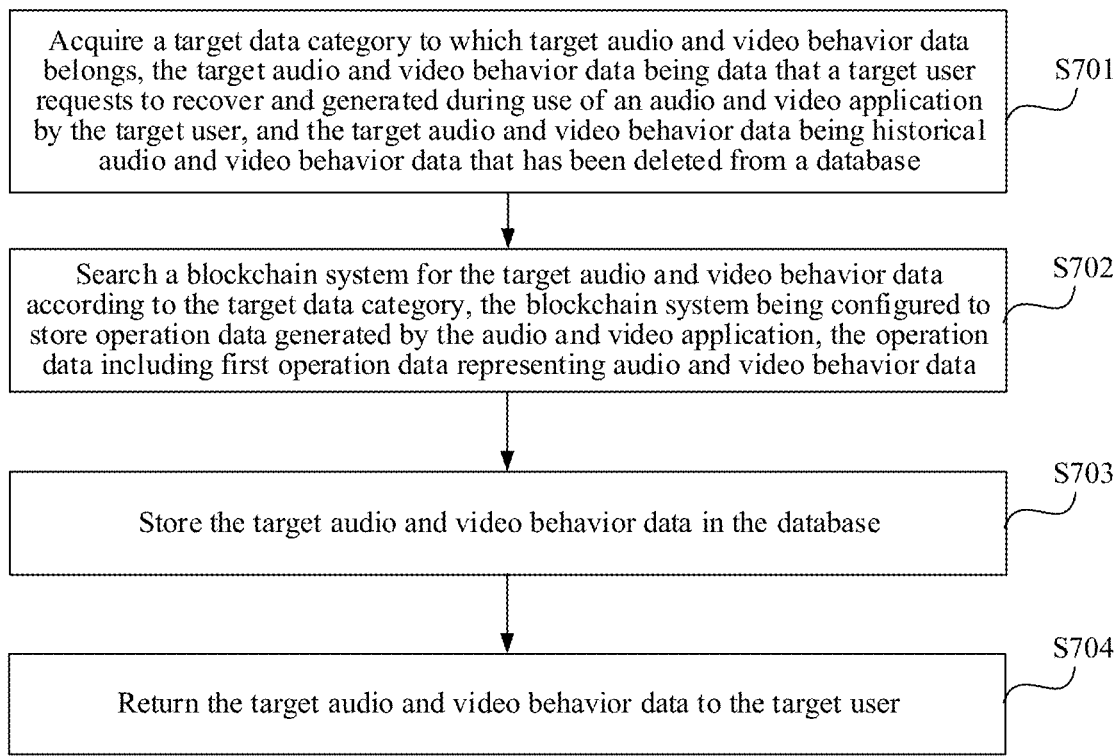
FIG. 7 is a flowchart of a data recovery method according to an embodiment of this application.

With reference to the foregoing data recovery system, the data recovery method provided in this embodiment of this application is described below. Specifically, FIG. 7 is a flowchart of a data recovery method according to an embodiment of this application. The data recovery method shown in FIG. 7 may be applicable to an electronic device. The electronic device may be the terminal shown in FIG. 5, or may be the audio and video server shown in FIG. 5, and may further be the target server shown in FIG. 6.

S701: Acquire a target data category to which target audio and video behavior data belongs, the target audio and video behavior data being data that a target user requests to recover and generated during use of an audio and video application by the target user, and the target audio and video behavior data being historical audio and video behavior data that has been deleted from a database.

A user may log in to the audio and video application on the terminal by using account information. When the user successfully logs in to the audio and video application by using the account information, the user may be considered as a logged-in user, and an account (vuid) corresponding to the account information of the user is used as a user identifier of the user. When the user successfully logs in to the audio and video application without using the account information, the user may be considered as an unlogged-in user, and the unlogged-in user may be regarded as a visitor. In this case, a hardware device identifier (guid) of the terminal where the audio and video application is located may be used as the user identifier of the user.

The user may transmit a data recovery request to the audio and video server through the audio and video application on the terminal. The data recovery request carries a data recovery condition, and the data recovery condition is used for indicating the target data category to which target audio and video behavior data that the user requests to recover belongs. In order to facilitate distinction, the user who transmits the data recovery request may be referred to as the target user. Correspondingly, the data recovery condition carried in the data recovery request indicates the target data category to which the target audio and video behavior data that the target user requests to recover belongs. Further, the data recovery condition may further carry the user identifier of the target user.

When the target user transmits the data recovery request after having successfully logged in to the audio and video application through the account information, the user identifier in the data recovery condition carried in the data recovery request is the account in the account information. When the target user transmits the data recovery request without successfully logging in to the audio and video application, the user identifier in the data recovery condition carried in the data recovery request is the hardware device identifier of the terminal configured to transmit the data recovery request.

In this embodiment of this application, the data recovery request indicates that the recovered audio and video behavior data is to-be-recovered audio and video behavior data, which may also be referred to as target audio and video behavior data. The data category to which the target audio and video behavior data belongs is referred to as the target data category. The target data category may be an audio and video watching data category, an audio and video purchase data category, a membership privilege purchase data category, an audio and video exchange data category, an audio and video gifting data category, and so on.

After the triggering operation behavior of the user on the audio and video provided by the audio and video application generates the audio and video behavior data, the audio and video server may store the audio and video behavior data in the database. In addition, the electronic device may store the audio and video behavior data in the blockchain system. For example, when the electronic device is the terminal and the audio and video application generates the audio and video behavior data, the audio and video behavior data is stored in the database by the audio and video server, and the audio and video behavior data is stored in the blockchain system by the terminal. For example, when the electronic device is the audio and video server and the audio and video application generates the audio and video behavior data, the audio and video behavior data is stored in the database by the audio and video server, and the audio and video behavior data is stored in the blockchain system by the audio and video server. For example, when the electronic device is the target server and the audio and video application generates the audio and video behavior data, the audio and video behavior data is stored in the database by the audio and video server, the audio and video behavior data is transmitted to the target server by the audio and video server, and the audio and video behavior data is stored in the blockchain system by the target server.

The above are merely several implementations provided in the embodiments of this application. Regarding specific implementations of storing the audio and video behavior data in the blockchain system, the inventor may set the implementation according to his/her requirements, which is not limited herein.

The audio and video behavior data generated by the audio and video application is required to be stored in both the database and the blockchain system. When the data deletion operation of the user on the audio and video behavior data generated in the audio and video application is involved, to-be-deleted audio and video behavior data indicated by the data deletion operation in the database is required to be deleted, but no deletion operation is performed on the audio and video behavior data in the blockchain system.

The audio and video server directly queries the database for a request result corresponding to the data query request after receiving the data query request transmitted by the user. In this way, if the data query request indicates that the queried audio and video behavior data has been deleted from the database, the audio and video server is unable to find the request result corresponding to the data query request.

Further, if the user is required to query the audio and video behavior data that has been deleted from the database, the data recovery request is required to be transmitted. After receiving the data recovery request, the electronic device is to query the blockchain system for the to-be-recovered target audio and video behavior data (that is, the request result of the data recovery request) indicated by the data recovery request. After the request result of the data recovery request is found from the blockchain system, the electronic device not only can return the request result to the audio and video application, so that the audio and video application displays the request result, but also can store the request result in the database, so that the recovered audio and video behavior data can be found from the database after the data query request is subsequently received.

S702: Search a blockchain system for the target audio and video behavior data according to the target data category, the blockchain system being configured to store operation data generated by the audio and video application, the operation data including first operation data representing audio and video behavior data.

After receiving the data recovery request transmitted by the target user, the electronic device acquires the user identifier carried in the data recovery request, determines the target data category to which the to-be-recovered target audio and video behavior data indicated by the data recovery request belongs, and may query the blockchain system for the target audio and video behavior data according to the target data category.

Operation data of each user who uses the audio and video application is stored in the blockchain system. The operation data of the user includes first operation data and second operation data of the user.

For example, the first operation data of the user includes the audio and video behavior data of the user on the audio and video application. Further, the electronic device may further obtain traceability data of the user according to the tracing operation on the audio and video behavior data of the user stored in the blockchain system, and store the traceability data of the user in the blockchain system. Correspondingly, the first operation data of the user may be considered to include two parts: the audio and video behavior data generated by the triggering operation behavior of the user on the audio and video provided by the audio and video application, and the traceability data of the user generated by performing the tracing operation on the audio and video behavior data of the user.

For example, if the data deletion operation/data recovery operation of the user on the audio and video behavior data is involved, the electronic device generates second operation data representing the operation information on the audio and video behavior data, and store the second operation data in the blockchain system.

Both the data deletion operation of the user on the audio and video behavior data and the data recovery operation of the user on the audio and video behavior data involve operations on the audio and video behavior data in the database. For example, the data deletion operation of the user on the audio and video behavior data involves the data deletion operation of the user on the audio and video behavior data in the database. According to the data recovery operation of the user on the audio and video behavior data, the recovered audio and video behavior data is to be eventually stored in the database, which may also be considered as the operation of the user on the audio and video behavior data in the database.

Therefore, the second operation data may represent the operation information of the user on the audio and video behavior data in the database. That is to say, the second operation data represents the operation behavior of the user on the audio and video behavior data in the database.

In this embodiment of this application, the audio and video behavior data of all users who use the audio and video application may be regarded as the audio and video behavior data of the audio and video application.

The blockchain system may be queried for the operation data of the user corresponding to the user identifier carried in the data recovery request, and then the target audio and video behavior data of the user is found from the operation data of the user according to the target data category. For the specific process of searching the blockchain system for the target audio and video behavior data according to the target data category, reference is made to the detailed description of FIG. 8, and the details are not described herein again.

S703: Store the target audio and video behavior data in the database.

S704: Return the target audio and video behavior data to the target user.

For example, if the electronic device is the terminal, the electronic device may return the target audio and video behavior data to the audio and video application after querying the blockchain system for the target audio and video behavior data, and store the target audio and video behavior data in the database. In one implementation, the terminal may first transmit the target audio and video behavior data to the audio and video server, and then the target audio and video behavior data is stored in the database by the audio and video server. In another implementation, the terminal directly stores the target audio and video behavior data in the database.

For example, if the electronic device is the audio and video server, the audio and video server may return the target audio and video behavior data to the audio and video application on the terminal after querying the blockchain system for the target audio and video behavior data, and the audio and video server may further store the target audio and video behavior data in the database.

For example, if the electronic device is the target server, the target server may transmit the target audio and video behavior data to the audio and video server after querying the blockchain system for the target audio and video behavior data, then the target audio and video behavior data is returned to the audio and video application on the terminal by the audio and video server, and the target audio and video data is stored in the database by the audio and video server.

In this embodiment of this application, the electronic device may return the found target audio and video behavior data to the audio and video application after finding the target audio and video behavior data from the blockchain system, so that the target audio and video behavior data can be displayed on the display interface of the audio and video application, which is convenient for the user to view. In addition, the electronic device may further store the target audio and video behavior data in the database after finding the target audio and video behavior data from the blockchain system. In this way, the user may transmit the data query request to the audio and video server through the audio and video application when needing to query the target audio and video behavior data again, and the audio and video server may directly query the database for the target video behavior data in response to the data query request without needing to recover data from the blockchain system.

Figure 8:
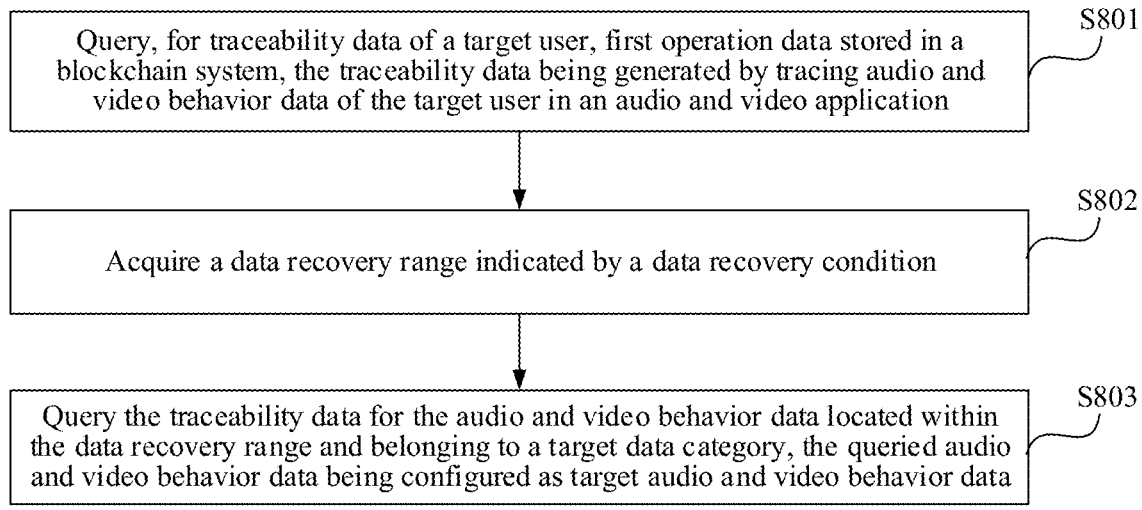
FIG. 8 is a flowchart of a method for searching, for target audio and video behavior data, a blockchain system configured to store operation data of an audio and video application according to a target data category according to an embodiment of this application.

The method for searching the blockchain system for the target audio and video behavior data according to the target data category by the electronic device is described in detail below with reference to FIG. 8. As shown in FIG. 8, the method includes the following steps.

S801: Query, for traceability data of the target user, first operation data stored in the blockchain system, the traceability data being generated by tracing the audio and video behavior data of the target user in the audio and video application.

The operation data stored in the blockchain system includes at least the audio and video behavior data generated by the user through the audio and video application. The electronic device may perform a tracing operation once every preset time interval (a standard duration, or a preset time threshold). The tracing operation involves the tracing operation on each user. One user is used as an example. The tracing operation on the user may mean that the tracing operation is performed on the audio and video behavior data generated by the user through the audio and video application in the blockchain system to generate traceability data of the user.

One user is used as an example. There are following two manners in which the tracing operation is performed on the audio and video behavior data generated by the user through the audio and video application in the blockchain system to generate the traceability data of the user.

First tracing manner: Determine a time period between a current operation (a current time) and a historical latest tracing operation on the user (a time of the historical latest tracing operation on the user). For ease of understanding, the time period may be referred to as an actual time period. The tracing operation is performed on the audio and video behavior data of the user generated by the audio and video application stored in the blockchain system during the actual time period, to obtain traceability data of the user during the actual time period. That is to say, statistics are collected on the audio and video behavior data of the user generated by the audio and video application stored in the blockchain system during the actual time period, to obtain the traceability data of the user during the actual time period.

The manner of determining the audio and video behavior data of the user generated by the audio and video application stored in the blockchain system during the actual time period may be determining the audio and video behavior data generated by the user through the audio and video application whose generation time is within the actual time period and stored in the blockchain system.

For example, a start time of the data recovery method provided in this embodiment of this application is 10:00 on Feb. 3, 2020. If the standard duration is 1 day, a user 1 is used as an example. First tracing may be performed on the user 1 at 10:00 on Feb. 4, 2020, and statistics are collected, based on the blockchain system, on all audio and video behavior data of the user 1 in the audio and video application from 10:00 on Feb. 3, 2020 to 10:00 on Feb. 4, 2020. Second tracing may be performed on the user 1 at 10:00 on Feb. 5, 2020, and statistics are collected, based on the blockchain system, on all audio and video behavior data of the user 1 in the audio and video application from 10:00 on Feb. 4, 2020 to 10:00 on Feb. 5, 2020. Third tracing is performed on the user 1 at 10:00 on Feb. 6, 2020, and statistics are collected, based on the blockchain system, on all audio and video behavior data of the user 1 in the audio and video application from 10:00 on Feb. 5, 2020 to 10:00 on Feb. 6, 2020.

Second tracing manner: Perform a historical tracing operation on the audio and video behavior data generated by the user through the audio and video application stored in the blockchain system, to generate the traceability data. That is to say, statistics are collected on all of the audio and video behavior data generated by the user through the audio and video application so far stored in the blockchain system, to obtain the traceability data of the user. That is to say, statistics are collected on all historical audio and video behavior data generated by the user through the audio and video application stored in the blockchain system, to obtain the traceability data of the user.

For example, a start time of the data recovery method provided in this embodiment of this application is 10:00 on Feb. 3, 2020. If the standard duration is 1 day, a user 1 is used as an example. First tracing is performed on the user 1 at 10:00 on Feb. 4, 2020, and statistics are collected, based on the blockchain system, on all audio and video behavior data generated by the user 1 through the audio and video application until on Feb. 4, 2020. Second tracing is performed on the user 1 at 10:00 on February 2020, and statistics are collected, based on the blockchain system, on all audio and video behavior data generated by the user 1 through the audio and video application until 10:00 on Feb. 5, 2020. Third tracing is performed on the user 1 at 10:00 on Feb. 6, 2020, and statistics are collected, based on the blockchain system, on all audio and video behavior data generated by the user 1 through the audio and video application until 10:00 on Feb. 6, 2020.

The start time of the data recovery method provided in this embodiment of this application may be regarded as the time at which the first tracing operation is performed. The start time of the data recovery method may be regarded as a time at which the data recovery method is initially performed.

In this embodiment of this application, the server performs the tracing operation once every preset time interval (the standard duration, or time threshold). For the tracing operation each time, after the tracing operation this time is completed, one piece of tracing data can be obtained for each user who uses the audio and video application before performing the tracing operation this time, so that the traceability data of all users is obtained and regarded as the traceability data generated by the tracing operation this time.

S802: Acquire a data recovery range indicated by the data recovery condition.

In this embodiment of this application, the data recovery condition indicates that there is the data recovery range. For the manner of acquiring the data recovery range indicated by the data recovery condition, reference is made to the detailed description of FIG. 9, and the details are not described herein again.

S803: Query the traceability data for the audio and video behavior data located within the data recovery range and of the target data category, the queried audio and video behavior data corresponding to the target audio and video behavior data.

The first operation data of the audio and video application stored in the blockchain system is queried for the traceability data of the target user, and the data recovery range indicated by the data recovery condition is acquired. The traceability data of the target user is queried for the audio and video behavior data located within the data recovery range and belonging to the target data category.

In this embodiment of this application, the traceability data of the target user may be obtained from the first operation data of the audio and video application stored in the blockchain system, and is regarded as at least one piece of traceability data of the target user.

For the first tracing manner, the first operation data of the audio and video application stored in the blockchain system is queried for at least one piece of traceability data of the target user. Each piece of traceability data in the at least one piece of traceability data corresponds to a different actual time period, and there is no time overlap between the actual time periods corresponding to different traceability data in the at least one piece of traceability data. Correspondingly, the manner of querying at least one piece of traceability data for the audio and video behavior data located within the data recovery range and belonging to the target data category may be: acquiring a generation time of the to-be-recovered audio and video behavior data indicated by the data recovery range (that is, determining a generation time of the target audio and video behavior data), determining the traceability data in the traceability data that matches the acquired generation time (for ease of distinction, the traceability data determined herein is referred to as first traceability data), and querying the first traceability data for the audio and video behavior data located within the data recovery range and belonging to the target data category, the queried audio and video behavior data being configured as the target audio and video behavior data.

The manner of determining the traceability data in the traceability data that matches the generation time may be: determining the actual time period corresponding to each piece of traceability data, acquiring, from the determined actual time periods, each actual time period where the generation time is located, and determining the determined traceability data of each actual time period as the traceability data matching the generation time.

In this embodiment of this application, the manner of acquiring, from the determined actual time periods, each actual time period where the generation time is located may be: considering the determined actual time period as the actual time period where the generation time is located, when there is a time overlap between the determined actual time period and the data generation time.

For example, at least one piece of traceability data includes the traceability data within an actual time period of 10:00-11:00, the traceability data within an actual time period of 11:00-12:00, and the traceability data within an actual time period of 12:00-13:00. If the generation time indicated by the data recovery range is 10:30-11:30, the traceability data in the at least one piece of traceability data that matches the generation time includes the traceability data within the actual time period of 10:00-11:00 and the traceability data within the actual time period of 11:00-12:00. There is no time overlap between 10:00-11:00 and 11:00-12:00, and there is no time overlap between 11:00-12:00 and 12:00-13:00. For example, 10:00-11:00 may not include 11:00, and 11:00-12:00 may not include 12:00.

For the second tracing manner, the manner of querying the traceability data for the audio and video behavior data located within the data recovery range and belonging to the target data category may be: determining the traceability data with a latest generation time point from the traceability data (for ease of distinction, the traceability data with the latest generation time point in the at least one piece of traceability data is referred to as second traceability data), and querying the second traceability data for the audio and video behavior data located within the data recovery range and belonging to the target data category.

In the second tracing manner, the performing time of the tracing operation is proportional to the generation time of the traceability data generated by the tracing operation. That is to say, a later execution time of the tracing operation leads to a later generation time of the traceability data generated by the tracing operation. In this way, the traceability data of the target user is searched for the traceability data with the latest generation time point, and the traceability data with the latest generation time point is the traceability data generated at the latest in the traceability data of the target user.

A later execution time of the tracing operation leads to more audio and video behavior data included in the generated traceability data. For example, the tracing is performed on the user 1 at 10:00 on Feb. 3, 2020, and statistics are collected, based on blockchain system, on all audio and video behavior data of the user 1 in the audio and video application until 10:00 on Feb. 3, 2020, to obtain traceability data 1. The tracing is performed on the user 1 at 10:00 on Mar. 3, 2020, and statistics are collected, based on blockchain system, on all audio and video behavior data of the user 1 in the audio and video application until 10:00 on Mar. 3, 2020, to obtain traceability data 2. The traceability data 2 includes the traceability data 1.

In this embodiment of this application, the first traceability data/the second traceability data is queried for the audio and video behavior data belonging to the target data category, and the queried audio and video behavior data is further queried for the audio and video behavior data within the data recovery range. In this case, the found audio and video behavior data within the data recovery range may be regarded as the to-be-recovered target audio and video behavior data indicated by the data recovery request. In this embodiment of this application, the data recovery can be realized based on the traceability data without needing to perform data traceability on the audio and video behavior data stored in the blockchain system during the data recovery, which can effectively improve the efficiency of data recovery.

Figure 9:
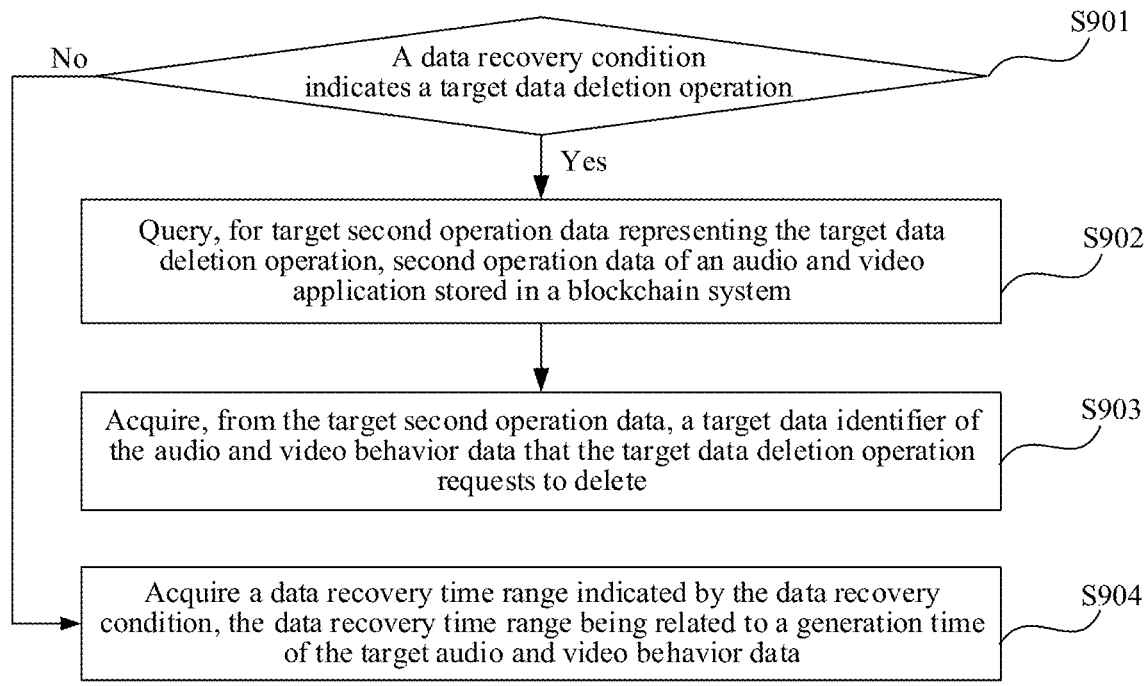
FIG. 9 is a flowchart of a method for acquiring a data recovery range indicated by a data recovery condition according to an embodiment of this application.

In this embodiment of this application, for the method for acquiring, by the electronic device, the data recovery range indicated by the data recovery condition, reference is made to FIG. 9. Specifically, FIG. 9 is a flowchart of a method for acquiring a data recovery range indicated by a data recovery condition according to an embodiment of this application.

As shown in FIG. 9, the method includes the following steps.

S901: Detect whether the data recovery condition indicates a target data deletion operation, perform step S902 if the data recovery condition indicates the target data deletion operation, and perform step S904 if the data recovery condition does not indicate the target data deletion operation.

When the target user transmits the data recovery request through the audio and video application, the data recovery request may be transmitted based on the selected data deletion operation. In this way, the data recovery condition carried in the data recovery request is related to the selected data deletion operation. For ease of distinction, the data deletion operation selected by the target user is referred to as the target data deletion operation.

The target data deletion operation is a data deletion operation that the target user requests the audio and video application to perform on the audio and video behavior data stored in the database.

For example, the target data deletion operation selected by the target user may be the historical latest data deletion operation performed by the target user, the historical third-to-last data deletion operation performed by the target user, the historical latest 10 data deletion operations performed by the target user, or the like. The target user may set the specific content of the target data deletion operation according to requirements of the target user, which is not limited herein.

S902: Query, for target second operation data representing the target data deletion operation, the second operation data of the audio and video application stored in the blockchain system.

In this embodiment of this application, if the data recovery condition indicates the target data deletion operation, the operation data of the target user stored in the blockchain system may be determined first, and the second operation data of the target user is determined from the operation data of the target user, so as to query the second operation data of the target user for the second operation data representing the target data deletion operation. For ease of distinction, the queried second operation data representing the target data deletion operation may be referred to as the target second operation data.

S903: Acquire, from the target second operation data, a target data identifier of to-be-deleted audio and video behavior data requested by the target data deletion operation.

In this embodiment of this application, the second operation data includes the data identifier of the to-be-deleted audio and video behavior data indicated by the data deletion operation represented by the second operation data. Based on this, the data identifier included in the target second operation data may be acquired (for ease of distinction, the acquired data identifier included in the target second operation data may be referred to as a target data identifier), and the target data identifier may be determined as the data recovery range indicated by the data recovery condition.

Correspondingly, if the data recovery range is the target data identifier, the manner of querying the first traceability data/the second traceability data for the audio and video behavior data belonging to the target data category, and further querying the queried audio and video behavior data for the data within the data recovery range may be: querying the first traceability data/the second traceability data for the audio and video behavior data belonging to the target data category, and acquiring, from the queried audio and video behavior data, data carrying the target data identifier.

S904: Acquire a data recovery time range indicated by the data recovery condition, the data recovery time range being related to a generation time of the target audio and video behavior data.

Further, if the data recovery condition does not indicate the target data deletion operation, it is determined whether the data recovery condition carries time information representing the data recovery time range. If the data recovery condition carries the time information representing the data recovery time range, the time information carried in the data recovery condition is acquired (the time information carried in the data recovery condition may be considered as the data recovery time range indicated by the data recovery condition). If the data recovery condition does not carry the time information representing the data recovery time range, a time period from a time point when the target user uses the audio and video application for the first time to a current time point is determined as the data recovery time range indicated by the data recovery condition.

Correspondingly, if the data recovery range is the data recovery time range, the manner of querying the first traceability data/the second traceability data for the audio and video behavior data belonging to the target data category, and further querying the queried audio and video behavior data for the audio and video behavior data within the data recovery range may be: querying the first traceability data/ the second traceability data for the audio and video behavior data belonging to the target data category, and further querying the queried audio and video behavior data for the audio and video behavior data within the data recovery time range. That is to say, the audio and video behavior data whose generation time is within the data recovery time range is queried.

In an implementation, if a time overlap exists between the data generation time of the audio and video data and the data recovery time range, the audio and video data is considered to be data within the data recovery time range.

In another implementation, if the data generation time of the audio and video data is completely covered by the data recovery time range, the audio and video data is considered to be data within the data recovery time range. The time overlap exists between the data generation time of the audio and video data and the data recovery time range, but the data generation time of the audio and video data is not completely covered by the data recovery time, it is considered that the audio and video data is not the data within the data recovery time range.

As long as there is the same time between two time periods, it may be considered that there is a time overlap between the two time periods. If the time range represented by one time period (a first time period) covers the time range represented by another time period (a second time period), it may be considered that the first time period covers the second time period.

The foregoing is merely just two implementations for determining whether the audio and video data is within the data recovery time range provided in the embodiments of this application. The specific manner of determining whether the audio and video data is within the data recovery time range may be set by the inventor according to the requirements of the inventor, which is not limited herein.

In this embodiment of this application, when the target user transmits the data recovery request through the audio and video application, if the data recovery request is transmitted based on the selected data deletion operation, the data recovery condition carried in the data recovery request is related to the selected data deletion operation. If the data recovery request is transmitted based on the selected data recovery time range, the data recovery condition carried in the data recovery request is related to the selected data recovery time range.

Further, if neither the data deletion operation nor the data recovery time range is selected by the target user when transmitting the data recovery request, the data recovery condition carried in the data recovery request transmitted by the target user indicates a default data recovery time range. The default data recovery time range is from a time point at which the target user uses the audio and video application for the first time to a current time point. That is to say, the time at which the target user uses the audio and video application for the first time is used as a start time point, the time at which the data recovery request transmitted by the target user is currently received is used as an end time point, and the time period formed by the start time point and the end time point may be considered as the default data recovery time range.

The embodiments of this application can implement different data recovery scenarios based on different setting manners of the data recovery range. Accordingly, more data recovery ways are provided for the user on the audio and video application side, which improves the convenience of user data recovery.

Based on the foregoing detailed description of the data recovery method and system provided in the embodiments of this application, the database in the data recovery system is to be further described. The database is configured to store the audio and video behavior data. For example, the audio and video behavior data of the user is stored in MySQL. In storage design, for a logged-in user, a user account vuid is configured as an identifier, and for an unlogged-in user, a device guid is configured as an identifier. In the MySQL table, the audio and video watching data is used as an example. The structure of the table of the audio and video watching data of the logged-in user may be shown in Table 2.

TABLE 2

Structure of Table of the audio and video watching data of the logged-in user

| Field | Category | Note |
| --- | --- | --- |
| vuid | int64 | User ID |
| cid | string | Album |
| vid | string | List |
| waich_time | date | Watching time |
| duration | int64 | Watching duration |
| platfrom | int | Platform number |
| guid | string | Device ID |
| location | string | Watching geographical location |
| scene | int | Watching scene |

In addition, the database provided in this embodiment of this application is designed as follows based on a user scale and a request volume.
1. Since the number of users or devices is in 100 million, the table is split for storage. According to the dimension of vuid, the table is split into 512 tables.
2. Read and write are separated in the database. For an online query interface, read of the database is requested (the user views historical data), and for online write (when the user plays the video, the historical data is deleted), write to the database is requested.
3. Data redundancy is created. In order to prevent data loss, the historical data of the user is backed up in a plurality of databases.
4. Multi-site high availability is adopted. In order to reduce request delays of users in different areas nationwide, data redundancy is distributed in five central cities across the country.

In addition, since an amount of reading and writing of the audio and video watching data is very large (when a user watches a video and a similar TV homepage is presented, the user pulls data of the watching history), if all requests read and write the database, the database may be unable to bear the amount at the peak of requests. Therefore, in order to reduce the burden of the database, a cache layer is added during reading and writing of requests. The process of reading and writing requests and the consistency design between the cache and the database are shown in FIG. 10A to FIG. 10B.

Figure 10A:
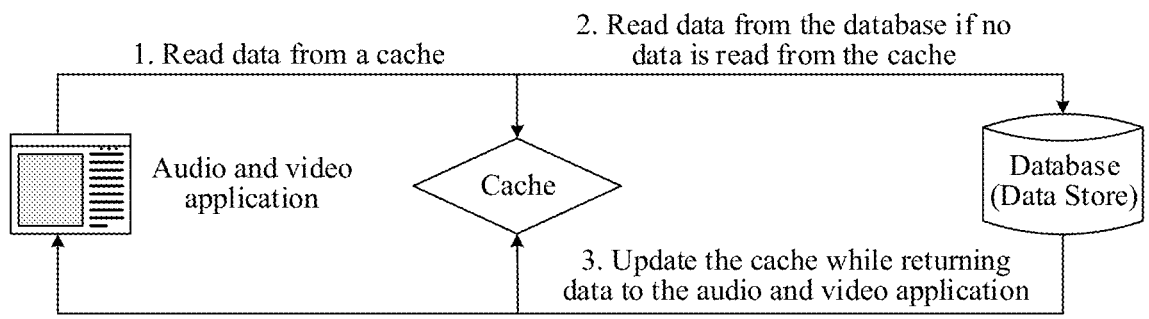
FIG. 10A to FIG. 10B are schematic diagrams showing interaction between a database and a cache according to an embodiment of this application.
Figure 10B:
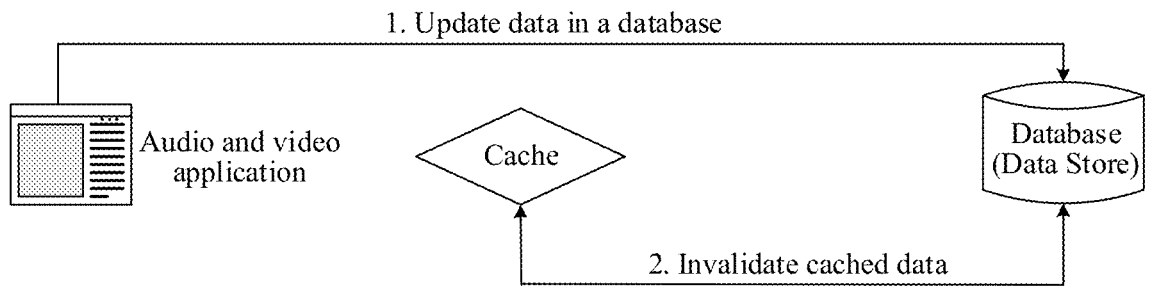

Referring to FIG. 10A, during data requesting, if the data is in the cache, the data is returned directly, or otherwise, the database is to be requested, and the cache is updated simultaneously after the data is found in the database. Referring to FIG. 10B, during data updating, the database is updated first, and the data in the cache is invalidated.

In addition to the audio and video watching data, the audio and video behavior data of the user further includes audio and video purchase data, gifting data, exchange data, and data about giving a like to a star as support. The design of the storage scheme is basically similar as the storage design of the audio and video watching data, except for the structure of the table and some design differences (for example, the online request volume of other audio and video behavior data except the audio and video watching data does not reach the level of the audio and video watching data, and therefore during requesting, the database storage is directly read without caching).

The database provided in this embodiment of this application adopts a multi-database backup mechanism, which effectively improves the stability of the database and improves the anti-risk capability of the database. Moreover, the database not only adopts the multi-site high availability, but also realizes data query in combination with the cache layer, which effectively reduces the burden on the database and improves the efficiency of the data query.

Further, this embodiment of this application further provides a data recovery scenario. The data recovery method provided in this embodiment of this application may be applicable to the scenario, and the implementation of the data recovery method provided in this embodiment of this application in the data recovery scenario is described in detail below.

Figure 11A:
FIG. 11A to FIG. 11D are schematic diagrams of a data recovery method according to an embodiment of this application.

A user whose user name is "Zhang San" opens a first user interface shown in FIG. 11A on the audio and video application, and an item "watching history" is displayed on the first user interface. The user whose user name is "Zhang San" and who has never deleted his/her own audio and video behavior data is used as an example. After the user opens the first user interface, the "watching history" item of the first user interface displays audio and video behavior data recently generated by "Zhang San", and the user clicks/taps "More" on the "watching history" item to jump to a second user interface shown in FIG. 11B.

Figure 11B:
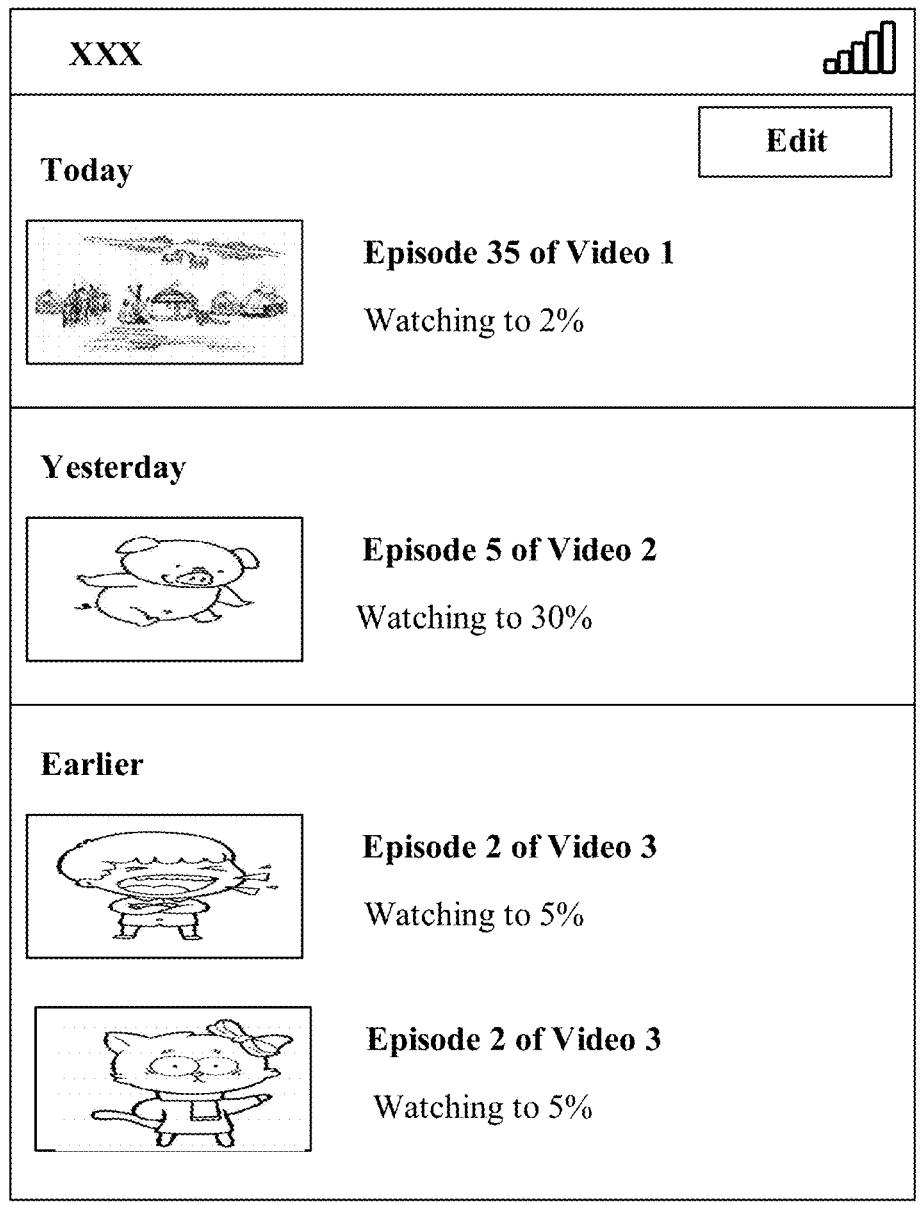

The detailed watching history of "Zhang San" is displayed on the second user interface shown in FIG. 11B. Referring to FIG. 11B, the user may trigger, through the "Edit" button on the second user interface, a data deletion operation on the audio and video behavior data in the detailed watching history displayed on the second user interface.

The audio and video behavior data in the detailed watching history of "Zhang San" is cleared through the "Edit" button in FIG. 11B by way of example. After the detailed watching history of "Zhang San" is cleared (correspondingly, the detailed watching history of "Zhang San" stored in the database is deleted), if the user returns to the first user interface, the display content of the first user interface is shown in FIG. 11C.

Figure 11C:

As shown in FIG. 11C, after the audio and video behavior data in the detailed watching history of "Zhang San" is cleared, if the first user interface is returned, any audio and video behavior data of "Zhang San" cannot be found from the database on the first user interface. Therefore, the content in the item of "watching history" in FIG. 11C is empty.

Referring to FIG. 11C, when the "watching history" is empty, the first user interface further provides a "watching history recovery" button. The user clicks/taps the "watching history recovery" button, and a watching history recovery interface may be displayed. The watching history recovery interface is shown in FIG. 11D.

Figure 11D:
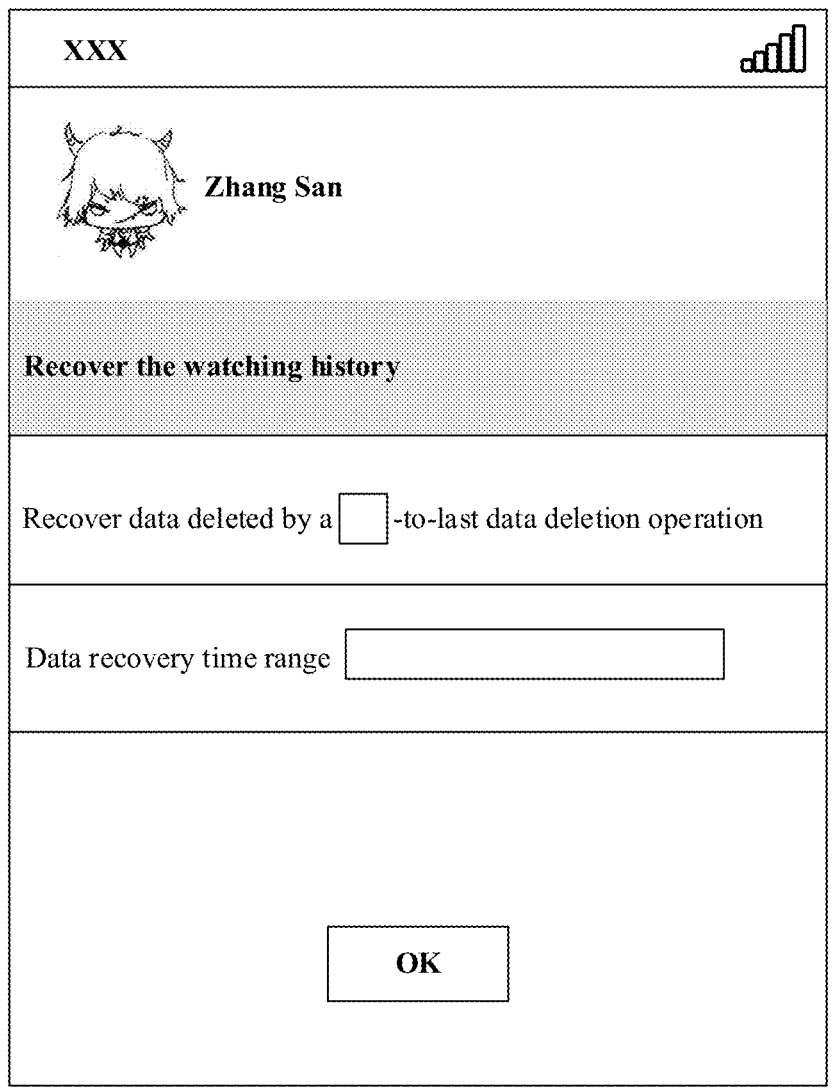

The user may fill in, on the watching history recovery interface shown in FIG. 11D, the data deleted by one data deletion operation required to recover, or fill in a data recovery time range in the watching history recovery interface shown in FIG. 11D. The user clicks/taps the "OK"

button shown in FIG. 11D after filling in the data, to trigger the server of the audio and video application to recover the data from the blockchain system.

In this application, the user does not fill in any information on the interface shown in FIG. 11D by way of example for description. That is to say, the user fills in neither the data deletion operation nor the data recovery time range, but directly clicks/taps the "OK" button. In this case, the server of the audio and video application recovers all of the historical audio and video behavior data of "Zhang San" from the blockchain system, and displays all of the recovered historical audio and video behavior data of "Zhang San", that is, switches to displaying the interface shown in FIG. 11B.

In addition, in this embodiment of this application, all of the recovered historical audio and video behavior data of "Zhang San" may further be stored in the database again, so that when the user opens the first user interface next time, the audio and video application can directly query the database for the audio and video behavior data of "Zhang San", and the displayed first user interface is shown in FIG. 11A.

The watching history may be considered as the audio and video watching data. The schematic diagrams of data recovery shown in FIG. 11A to FIG. 11D provided in the embodiments of this application involve the recovery of data belonging to the data category of "audio and video watching data". If the user wants to recover data belonging to other data categories, the user can enter from other positions on the interface. For example, an order shown in FIG. 11A may be considered as the audio and video purchase data. The user clicks/taps the "order" button shown in FIG. 11A to query all of the audio and video purchase data of "Zhang San" in the database, thereby realizing operations such as deleting and recovering the audio and video purchase data of "Zhang San". The method for recovering the data belonging to the data category of the "audio and video purchase data" is not described in detail herein.

According to the data recovery method provided in this embodiment of this application, a new function is added to the user in terms of product experience, so as to recover previously deleted records. Compared with the current conventional storage scheme based on NoSQL or SQL, the security is strengthened, so that there is no risk of deleting user data by mistake by an operator. In the existing storage scheme, only the audio and video behavior data of the user is stored, for example, watching history, purchase records, and the like. However, in the data recovery method provided in this embodiment of this application, both the audio and video behavior data of the user and the operation data of the user on the audio and video behavior data are stored, for example, second operation data representing the data deletion operation, second operation data representing the data recovery operation, and the like. The data may be properly used for a user profile and analysis, which improves the accuracy of the user profile and provides a better data basis for the user profile analysis.

Figure 12:
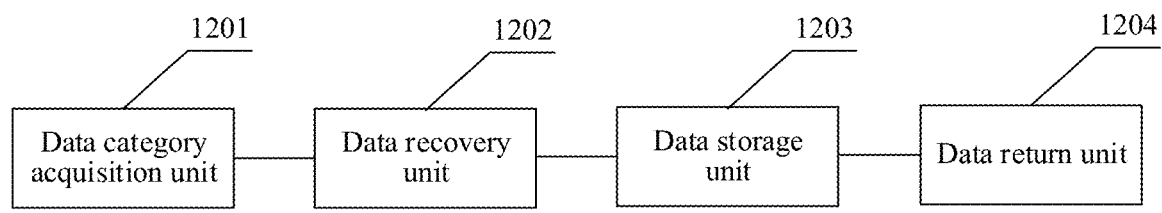
FIG. 12 is a schematic structural diagram of a data recovery apparatus according to an embodiment of this application.

FIG. 12 is a schematic structural diagram of a data recovery apparatus according to an embodiment of this application.

As shown in FIG. 12, the apparatus includes:
a data category acquisition unit 1201, configured to acquire a target data category to which target audio and video behavior data belongs, the target audio and video behavior data being data that a target user requests to recover and generated during use of an audio and video application by the target user, and the target audio and video behavior data being historical audio and video behavior data that has been deleted from a database;
a data recovery unit 1202, configured to search a blockchain system for the target audio and video behavior data according to the target data category, the blockchain system being configured to store operation data generated by the audio and video application, the operation data including first operation data representing audio and video behavior data;
a data storage unit 1203, configured to store the target audio and video behavior data in the database; and
a data return unit 1204, configured to return the target audio and video behavior data to the target user.

In this embodiment of this application, the data category acquisition unit includes:
a data recovery request receiving unit, configured to receive a data recovery request transmitted by the target user, the data recovery request carrying a data recovery condition, the data recovery condition being used for indicating the target data category to which the target audio and video behavior data requested to recover belongs, and the audio and video behavior data corresponding to different operation types of operation behaviors belonging to different data categories; and
a data category acquisition subunit, configured to parse the data recovery condition in the data recovery request, and determine the target data category to which the target audio and video behavior data belongs.

In this embodiment of this application, the data recovery unit includes:
a traceability data determination unit, configured to query, for traceability data of the target user, the first operation data stored in the blockchain system, the traceability data being generated by tracing the audio and video behavior data of the target user in the audio and video application;
a data recovery range acquisition unit, configured to acquire a data recovery range indicated by the data recovery condition; and
a data recovery subunit, configured to query the traceability data for the audio and video behavior data located within the data recovery range and belonging to the target data category, the queried audio and video behavior data being configured as the target audio and video behavior data.

In this embodiment of this application, the operation data further includes second operation data representing operation information on the audio and video behavior data of the audio and video application stored in the database. Correspondingly, the data recovery range acquisition unit includes:
an operation detection unit, configured to detect whether the data recovery condition indicates a target data deletion operation, the target data deletion operation being a deletion operation that the target user requests the audio and video application to perform on the audio and video behavior data stored in the database;
a query unit, configured to query, for target second operation data representing the target data deletion operation, the second operation data stored in the blockchain system, when the data recovery condition indicates the target data deletion operation; and
a data identifier acquisition unit, configured to acquire, from the target second operation data, a target data identifier of the to-be-deleted audio and video behavior data requested by the target data deletion operation.

Further, the acquisition unit provided in this embodiment of this application further includes:

a data recovery time range acquisition unit, configured to acquire a data recovery time range indicated by the data recovery condition, the data recovery time range being related to a generation time of the target audio and video behavior data.

In this embodiment of this application, the data recovery time range acquisition unit includes:

a time information detection unit, configured to detect whether the data recovery condition carries time information representing the data recovery time range;

a time information acquisition unit, configured to acquire the time information when the data recovery condition carries the time information representing the data recovery time range; and a time range determination unit, configured to determine, when the data recovery condition does not carry the time information representing the data recovery time range, that the data recovery time range indicated by the data recovery condition is from a time point at which the target user uses the audio and video application for a first time to a current time point.

The data recovery apparatus provided in this embodiment of this application further includes a traceability data generation unit.

As an implementation of this embodiment of this application, the traceability data generation unit includes:

a first detection unit, configured to detect whether a target duration reaches a preset standard duration, the target duration being a duration of an actual time period between a current time point and a time point of a previous tracing operation; and a first generation unit, configured to perform, in a case that the target duration reaches the standard duration, the tracing operation on audio and video behavior data generated during the actual time period by the audio and video application stored in the blockchain system, to generate traceability data during the actual time period.

Correspondingly, the data recovery subunit includes:

a data generation time acquisition unit, configured to acquire the generation time of the target audio and video behavior data indicated by the data recovery range;

a first traceability data determination unit, configured to determine, from the traceability data, first traceability data matching the generation time; and a first recovery unit, configured to query the first traceability data for the audio and video behavior data located within the data recovery range and belonging to the target data category.

As an implementation of this embodiment of this application, the traceability data generation unit includes:

a second detection unit, configured to detect whether a target duration reaches a preset standard duration, the target duration being a duration of an actual time period between a current time point and a time point of a previous tracing operation; and a second generation unit, configured to perform, in a case that the target duration reaches the standard duration, a historical tracing operation on the audio and video behavior data of the audio and video application stored in the blockchain system to generate the traceability data.

Correspondingly, the data recovery subunit includes:

a second traceability data determination unit, configured to determine second traceability data with a latest generation time point from the traceability data; and a second recovery unit, configured to query the second traceability data for the audio and video behavior data located within the data recovery range and belonging to the target data category.

Further, the data recovery apparatus provided in this embodiment of this application further includes a data storage unit. The data storage unit includes:

a second operation data generation unit, configured to generate, according to the target audio and video behavior data, second operation data related to the data recovery request; and a second operation data storage subunit, configured to store the second operation data in the blockchain system.

Further, the data recovery apparatus provided in this embodiment of this application further includes a user profile unit. The user profile unit is configured to analyze the operation data of the target user in the audio and video application to generate the user profile of the target user.

This embodiment of this application provides a data recovery apparatus. The data recovery apparatus may acquire the target data category to which the target audio and video behavior data that the target user requests to recover belongs (the target audio and video behavior data is historical audio and video behavior data that has been deleted from the database). According to the target data category, the blockchain system configured to store the operation data of the audio and video application (the operation data includes the first operation data representing the audio and video behavior data of the audio and video application) may be searched for the target audio and video behavior data. Based on this, the data recovery apparatus not only can store the queried target audio and video behavior data in the database, but also can return the queried target audio and video behavior data to the audio and video application for viewing by the target user, thereby realizing the recovery of the audio and video behavior data that has been deleted from the database.

Figure 13:
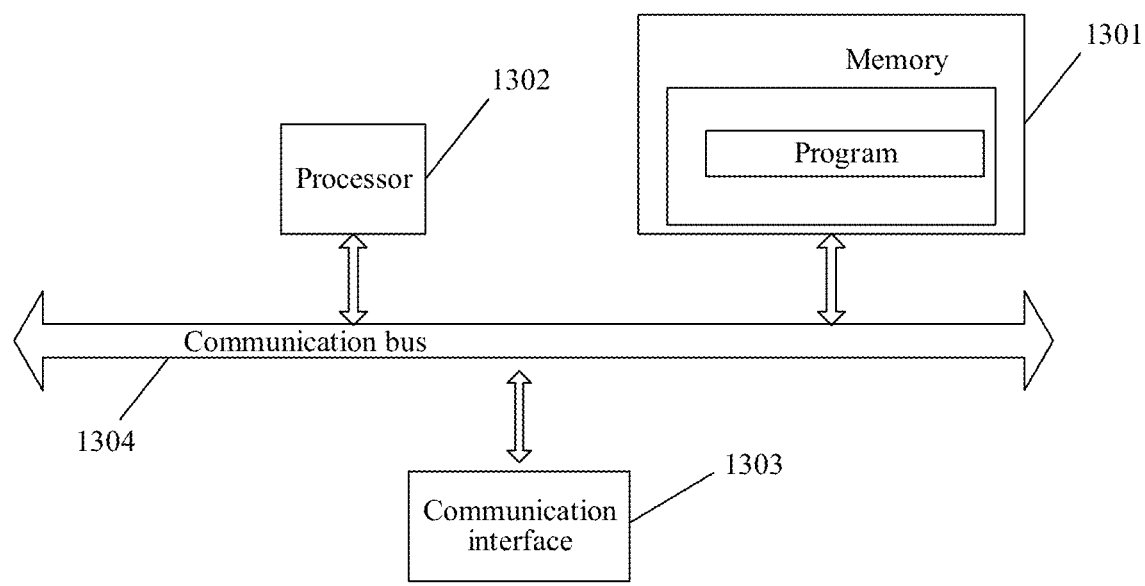
FIG. 13 is a block diagram of a hardware structure of an electronic device to which a data recovery method is applicable according to an embodiment of this application.

As shown in FIG. 13, FIG. 13 is a structural diagram of an implementation of an electronic device provided according to an embodiment of this application. The electronic device includes:

a memory 1301, configured to store a program;

a processor 1302, configured to execute a program, where the program is specifically configured to:

acquire a target data category to which target audio and video behavior data belongs, the target audio and video behavior data being data that a target user requests to recover and generated during use of an audio and video application by the target user, and the target audio and video behavior data being historical audio and video behavior data that has been deleted from a database;

search a blockchain system for the target audio and video behavior data according to the target data category, the blockchain system being configured to store operation data generated by the audio and video application, the operation data including first operation data representing audio and video behavior data;

store the target audio and video behavior data in the database; and return the target audio and video behavior data to the target user.

The processor 1302 may be a central processing unit (CPU) or an application-specific integrated circuit (ASIC).

The control device may further include a communication interface 1303 and a communication bus 1304. The memory 1301, the processor 1302, and the communication interface 1303 communicate with each other by using the communication bus 1304.

Embodiments of this application further provides a readable storage medium, storing a computer program, the computer program being loaded and executed by a processor to implement the steps of the data recovery method. For a specific implementation, reference may be made to descriptions in corresponding parts of the foregoing embodiments, which is not repeated in this embodiment.

An embodiment of this application further provides a computer program product or a computer program. The computer program product or the computer program includes a computer instruction. The computer instruction is stored in a computer-readable storage medium. A processor of a computer device reads the computer instructions from the computer-readable storage medium, and executes the computer instructions, so that the computer device implements the methods provided in the various optional implementations of the data recovery method or data recovery apparatus. For a specific implementation process, reference may be made to the descriptions of the above corresponding embodiments, which is not repeated.

The embodiments of this application provide a data recovery method and apparatus, an electronic device, and a storage medium. A target data category to which target audio and video behavior data that a target user requests to recover belongs is acquired (the target audio and video behavior data is historical audio and video behavior data that has been deleted from the database). A blockchain system configured to store operation data (the operation data includes first operation data representing audio and video behavior data of the audio and video application) of the audio and video application may be searched for the target audio and video behavior data according to the target data category. In this way, the queried target audio and video behavior data can be stored in the database and can be returned to the audio and video application for viewing by the target user, thereby realizing the recovery of the audio and video behavior data ever deleted from the database.

In sum, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit.

A data recovery method and apparatus, an electronic device, and a storage medium provided in the embodiments of the present invention are described in detail above. Although the principles and implementations of the present invention are described by using specific examples in this specification, the descriptions of the foregoing embodiments are merely intended to help understand the method and the core idea of the method of the present invention. Meanwhile, a person of ordinary skill in the art may make modifications to the specific implementations and application scopes according to the ideas of the present invention. In conclusion, the content of the specification should not be construed as a limitation to the present invention.

What is claimed is:

1. A data recovery method, the method comprising:

receiving a request to recover target audio and video behavior data generated during use of an audio and video application by a target user, wherein the target audio and video behavior data has been deleted from a database;

obtaining a target data category of the target audio and the video behavior data;

searching a blockchain system for the target audio and video behavior data based on the target data category, the blockchain system being configured to store operation data generated by the audio and video application that includes first operation data of audio and video behavior data;

storing the target audio and video behavior data in the database; and returning the target audio and video behavior data to the target user.

2. The method according to claim 1, wherein obtaining the target data category comprises:

receiving a data recovery request having a data recovery condition, the data recovery condition indicates the target data category to which the target audio and video behavior data belongs, and wherein the audio and video behavior data corresponding to different operational behaviors belong to different data categories; and parsing the data recovery condition in the data recovery request to determine the target data category of the target audio and video behavior data.

3. The method according to claim 2, wherein searching the blockchain system comprises:

querying the first operation data stored in the blockchain system for traceability data of the target user, the traceability data being generated by tracing the audio and video behavior data of the target user in the audio and video application;

obtaining a data recovery range from the data recovery condition; and querying the traceability data for audio and video behavior data located within the data recovery range and in the target data.

4. The method according to claim 3, wherein the operation data further comprises second operation data representing operation information of the audio and video behavior data of the audio and video application stored in the database, and acquiring the data recovery range comprises:

detecting whether the data recovery condition indicates a target data deletion operation, the target data deletion operation being a deletion operation requested by the target user via the audio and video application on the audio and video behavior data stored in the database;

in accordance with a determination that the data recovery condition indicates the deletion operation, querying, for target second operation data stored in the blockchain system of the target data deletion operation; and acquiring, from the target second operation data, a target data identifier of to-be-deleted audio and video behavior data of the target data deletion operation.

5. The method according to claim 4, further comprising:

in accordance with a determination that the data recovery condition does not indicate the target data deletion operation, obtaining a data recovery time range of a generation time of the target audio and video behavior data from the data recovery condition.

6. The method according to claim 5, wherein obtaining the data recovery time range comprises:
in accordance with a determination that the data recovery condition contains the data recovery time range, acquiring the time information; and
in a accordance with a determination that the data recovery condition does not contain the data recovery time range, setting the data recovery time range of the data recovery condition to begin from when the target user uses the audio and video application for a first time to a current time point.

7. The method according to claim 3, further comprising:
in accordance with a determination that a target duration meets a preset threshold, the target duration being a duration between a current time point and a time point of a previous tracing operation; and
in accordance with a determination that the target duration reaches the standard duration, performing the tracing operation on audio and video behavior data generated during the target duration by the audio and video application stored in the blockchain system to generate the traceability data.

8. The method according to claim 7, wherein querying the traceability data for audio and video behavior data comprises:
acquiring the generation time of the target audio and video behavior data indicated by the data recovery range;
determining, from the traceability data, first traceability data matching the generation time; and
querying the first traceability data for the audio and video behavior data located within the data recovery range and belonging to the target data category.

9. The method according to claim 3, wherein the traceability data is generated by:
detecting whether a target duration reaches a preset time threshold, the target duration being a duration of an actual time period between a current time point and a time point of a previous tracing operation; and
generating the traceability data, in accordance with a determination that the target duration meets the preset threshold, by performing a historical tracing operation on the audio and video behavior data of the audio and video application stored in the blockchain system.

10. The method according to claim 9, wherein querying the traceability data for audio and video behavior data comprises:
determining second traceability data with a latest generation time point from the traceability data; and
querying the second traceability data for the audio and video behavior data located within the data recovery range and from the target data category.

11. The method according to claim 2, further comprising:
generating, according to the target audio and video behavior data, second operation data related to the data recovery request; and
storing the second operation data in the blockchain system.

12. The method according to claim 1, further comprising:
analyzing the operation data of the target user in the audio and video application to generate a user profile of the target user.

13. An electronic device, comprising:
one or more processors; and
memory storing one or more programs, the one or more programs comprising instructions that, when executed by the one or more processors, cause the one or more processors to perform operations comprising:
receiving a request to recover target audio and video behavior data generated during use of an audio and video application by a target user, wherein the target audio and video behavior data has been deleted from a database;
obtaining a target data category of the target audio and the video behavior data;
searching a blockchain system for the target audio and video behavior data based on the target data category, the blockchain system being configured to store operation data generated by the audio and video application that includes first operation data of audio and video behavior data;
storing the target audio and video behavior data in the database; and
returning the target audio and video behavior data to the target user.

14. The electronic device of claim 13, wherein obtaining the target data category comprises:
receiving a data recovery request having a data recovery condition, the data recovery condition indicates the target data category to which the target audio and video behavior data belongs, and wherein the audio and video behavior data corresponding to different operational behaviors belong to different data categories; and
parsing the data recovery condition in the data recovery request to determine the target data category of the target audio and video behavior data.

15. The electronic device of claim 14, wherein searching the blockchain system comprises:
querying the first operation data stored in the blockchain system for traceability data of the target user, the traceability data being generated by tracing the audio and video behavior data of the target user in the audio and video application;
obtaining a data recovery range from the data recovery condition; and
querying the traceability data for audio and video behavior data located within the data recovery range and in the target data.

16. The electronic device of claim 15, wherein the operation data further comprises second operation data representing operation information of the audio and video behavior data of the audio and video application stored in the database, and acquiring the data recovery range comprises:
detecting whether the data recovery condition indicates a target data deletion operation, the target data deletion operation being a deletion operation requested by the target user via the audio and video application on the audio and video behavior data stored in the database;
in accordance with a determination that the data recovery condition indicates the deletion operation, querying, for target second operation data stored in the blockchain system of the target data deletion operation; and
acquiring, from the target second operation data, a target data identifier of to-be-deleted audio and video behavior data of the target data deletion operation.

17. A non-transitory computer-readable storage medium, storing a computer program, the computer program, when executed by one or more processors of an electronic device, cause the one or more processors to perform operations comprising:

one or more processors; and memory storing one or more programs, the one or more programs comprising instructions that, when executed by the one or more processors, cause the one or more processors to perform operations comprising:

receiving a request to recover target audio and video behavior data generated during use of an audio and video application by a target user, wherein the target audio and video behavior data has been deleted from a database;

obtaining a target data category of the target audio and the video behavior data;

searching a blockchain system for the target audio and video behavior data based on the target data category, the blockchain system being configured to store operation data generated by the audio and video application that includes first operation data of audio and video behavior data;

storing the target audio and video behavior data in the database; and returning the target audio and video behavior data to the target user.

18. The non-transitory computer-readable storage medium of claim 17, wherein obtaining the target data category comprises:

receiving a data recovery request having a data recovery condition, the data recovery condition indicates the target data category to which the target audio and video behavior data belongs, and wherein the audio and video behavior data corresponding to different operational behaviors belong to different data categories; and parsing the data recovery condition in the data recovery request to determine the target data category of the target audio and video behavior data.

19. The non-transitory computer-readable storage medium of claim 18, wherein searching the blockchain system comprises:

querying the first operation data stored in the blockchain system for traceability data of the target user, the traceability data being generated by tracing the audio and video behavior data of the target user in the audio and video application;

obtaining a data recovery range from the data recovery condition; and querying the traceability data for audio and video behavior data located within the data recovery range and in the target data.

20. The non-transitory computer-readable storage medium of claim 19, wherein the operation data further comprises second operation data representing operation information of the audio and video behavior data of the audio and video application stored in the database, and acquiring the data recovery range comprises:

detecting whether the data recovery condition indicates a target data deletion operation, the target data deletion operation being a deletion operation requested by the target user via the audio and video application on the audio and video behavior data stored in the database;

in accordance with a determination that the data recovery condition indicates the deletion operation, querying, for target second operation data stored in the blockchain system of the target data deletion operation; and acquiring, from the target second operation data, a target data identifier of to-be-deleted audio and video behavior data of the target data deletion operation.

* * * * *